United States Patent
Matsumoto et al.

(10) Patent No.: US 7,603,215 B2
(45) Date of Patent: Oct. 13, 2009

(54) LANE KEEP CONTROL APPARATUS AND METHOD FOR AUTOMOTIVE VEHICLE

(75) Inventors: Shinji Matsumoto, Kanagawa (JP); Satoshi Tange, Kanagawa (JP); Masayasu Shimakage, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/001,156

(22) Filed: Dec. 2, 2004

(65) Prior Publication Data

US 2005/0125125 A1     Jun. 9, 2005

(30) Foreign Application Priority Data

Dec. 3, 2003     (JP) ............................. 2003-404633

(51) Int. Cl.
B62D 6/00     (2006.01)
G06F 17/00    (2006.01)

(52) U.S. Cl. .................... 701/41; 701/43; 701/70; 701/71; 701/300; 701/301

(58) Field of Classification Search .............. 701/41, 701/70, 43, 71, 300, 301
See application file for complete search history.

(56) References Cited

U.S. PATENT DOCUMENTS

| | | | | |
|---|---|---|---|---|
| 5,483,453 A * | 1/1996 | Uemura et al. ................. 701/23 |
| 5,913,375 A * | 6/1999 | Nishikawa ................... 180/168 |
| 6,185,492 B1 * | 2/2001 | Kagawa et al. ................ 701/41 |
| 6,205,375 B1 * | 3/2001 | Naito ............................ 701/1 |
| 6,370,474 B1 * | 4/2002 | Hiwatashi et al. ........... 701/300 |
| 6,409,287 B1 * | 6/2002 | Leach et al. ................ 303/146 |
| 6,411,901 B1 * | 6/2002 | Hiwatashi et al. ........... 701/301 |
| 6,487,501 B1 * | 11/2002 | Jeon .......................... 701/301 |
| 6,493,619 B2 * | 12/2002 | Kawazoe et al. .............. 701/41 |
| 6,628,210 B2 * | 9/2003 | Lee ............................ 340/988 |
| 6,708,098 B2 | 3/2004 | Matsumoto et al. |

(Continued)

FOREIGN PATENT DOCUMENTS

DE     19958056     * 7/2000

(Continued)

OTHER PUBLICATIONS

U.S. Appl. No. 10/828,462, filed Apr. 21, 2004, Matsumoto et al.

(Continued)

*Primary Examiner*—Jack W. Keith
*Assistant Examiner*—Chuong P Nguyen
(74) *Attorney, Agent, or Firm*—Foley & Lardner LLP

(57) ABSTRACT

In lane keep control apparatus and method for an automotive vehicle, a deviation tendency detecting section detects whether the vehicle has a tendency of a deviation from a traveling traffic lane and a deviation avoidance controlling section performs a control for the vehicle to travel on a road surface which is parallel to the traveling traffic lane when the deviation tendency detecting section detects that the vehicle has the tendency of the deviation from the traveling traffic lane and, thereafter, performs a control to prevent a yaw angle of the vehicle with respect to the traveling traffic lane from increasing in a direction in which the tendency of the deviation becomes large.

15 Claims, 10 Drawing Sheets

U.S. PATENT DOCUMENTS

| | | | |
|---|---|---|---|
| 6,732,021 B2 * | 5/2004 | Matsumoto et al. | 701/1 |
| 6,792,345 B2 * | 9/2004 | Matsumoto et al. | 701/96 |
| 6,850,629 B2 * | 2/2005 | Jeon | 382/104 |
| 6,879,890 B2 * | 4/2005 | Matsumoto et al. | 701/23 |
| 6,930,593 B2 * | 8/2005 | Crawshaw | 340/435 |
| 2002/0041229 A1 * | 4/2002 | Satoh et al. | 340/438 |
| 2002/0169531 A1 * | 11/2002 | Kawazoe et al. | 701/41 |
| 2004/0010371 A1 * | 1/2004 | Matsumoto et al. | 701/300 |

FOREIGN PATENT DOCUMENTS

| | | |
|---|---|---|
| JP | 7-160993 A | 6/1995 |
| JP | 10-3598 A | 1/1998 |
| JP | 11-139335 A | 5/1999 |
| JP | 11-180327 A | 7/1999 |
| JP | 11-189166 A | 7/1999 |
| JP | 11-296660 A | 10/1999 |
| JP | 2001-101565 A | 4/2001 |
| JP | 2002-32125 A | 1/2002 |
| JP | 2003-104091 A | 4/2003 |

OTHER PUBLICATIONS

U.S. Appl. No. 10/825,108, filed Apr. 16, 2004, Matsumoto et al.
U.S. Appl. No. 10/790,269, filed Mar. 2, 2004, Shimakage.
U.S. Appl. No. 10/798,407, filed Mar. 12, 2004, Tange et al.
U.S. Appl. No. 10/798,405, filed Mar. 12, 2004, Tange et al.
U.S. Appl. No. 10/982,878, filed Nov. 8, 2004, Shimakage et al.
U.S. Appl. No. 11/001,185, filed Dec. 2, 2004, Matsumoto et al.
U.S. Appl. No. 10/994,319, filed Nov. 23, 2004, Tange et al.

* cited by examiner

LANE KEEP CONTROL APPARATUS AND METHOD FOR AUTOMOTIVE VEHICLE

BACKGROUND OF THE INVENTION

1. Field of the Invention

The present invention relates to lane keep control apparatus and method for an automotive vehicle which are capable of preventing a deviation of the vehicle from a traveling traffic lane on which the vehicle is traveling when the vehicle is about to deviate from the traffic lane during a travel.

2. Description of the Related Art

A Japanese Patent Application First Publication No. Heisei 11-180327 published on Jul. 6, 1999 exemplifies a previously proposed lane keep control apparatus. In the previously proposed lane keep control apparatus, a steering actuator is controlled in accordance with a lateral deviation quantity which is a distance from a reference position of the traffic lane on which the vehicle is traveling to a traveling position of the vehicle (the vehicle is also hereinafter called a host vehicle), for example, when the host vehicle has a tendency of deviating from the traffic lane so as to prevent the deviation of the host vehicle from the traffic lane.

SUMMARY OF THE INVENTION

In the above-described lane keep control apparatus, the steering actuator is forcefully controlled irrespective of the steering operation by a vehicle driver. Hence, although the deviation from the traveling traffic lane can be avoided, it often becomes unnecessary for the vehicle driver to carry out an operation for the prevention of the traffic lane deviation. The previously proposed lane keep control apparatus serves to play a role exceeding the purpose that the lane keep control apparatus inherently has.

Especially, in a traveling road surface on which a recess or convex portion, namely, so-called, a rambling strip is artificially arranged on a traffic lane block (division) line or in the proximity along the traffic lane block (division) line, a vibration or sound is developed in a case where any road wheel of the host vehicle is traveling on the rambling strip so that the driver is recognized that the vehicle is deviated from the traffic lane. However, in a case where the lane keep control apparatus controls the vehicle in a direction in which the deviation from the traffic lane is avoided, as often the case, the driver cannot recognize that the vehicle has the tendency of deviating from the traffic lane. The natural purpose of arranging the rambling strip on the traveling road surface cannot be achieved.

It is, therefore, an object of the present invention to provide improved lane keep control apparatus and method for an automotive vehicle which are capable of having the driver himself carry out the operation to avoid the deviation of the vehicle from the traffic lane with the traffic lane deviation recognized for the driver while avoiding the deviation of the vehicle from the traffic lane.

The above-described object can be achieved by providing a lane keep control apparatus for an automotive vehicle, comprising: a deviation tendency detecting section that detects whether the vehicle has a tendency of a deviation from a traveling traffic lane; and a deviation avoidance controlling section that performs a control for the vehicle to travel on a road surface which is parallel to the traveling traffic lane when the deviation tendency detecting section detects that the vehicle has the tendency of the deviation from the traveling traffic lane and, thereafter, performs a control to prevent a yaw angle of the vehicle with respect to the traveling traffic lane from increasing in a direction in which the tendency of the deviation becomes large.

The above-described object can also be achieved by providing a lane keep control method for an automotive vehicle, comprising: detecting whether the vehicle has a tendency of a deviation from a traveling traffic lane; performing a control for the vehicle to travel on a road surface which is parallel to the traveling traffic lane when detecting that the vehicle has the tendency of the deviation from the traveling traffic lane; and performing a control to prevent a yaw angle of the vehicle with respect to the traveling traffic lane from increasing in a direction in which the tendency of the deviation becomes large.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
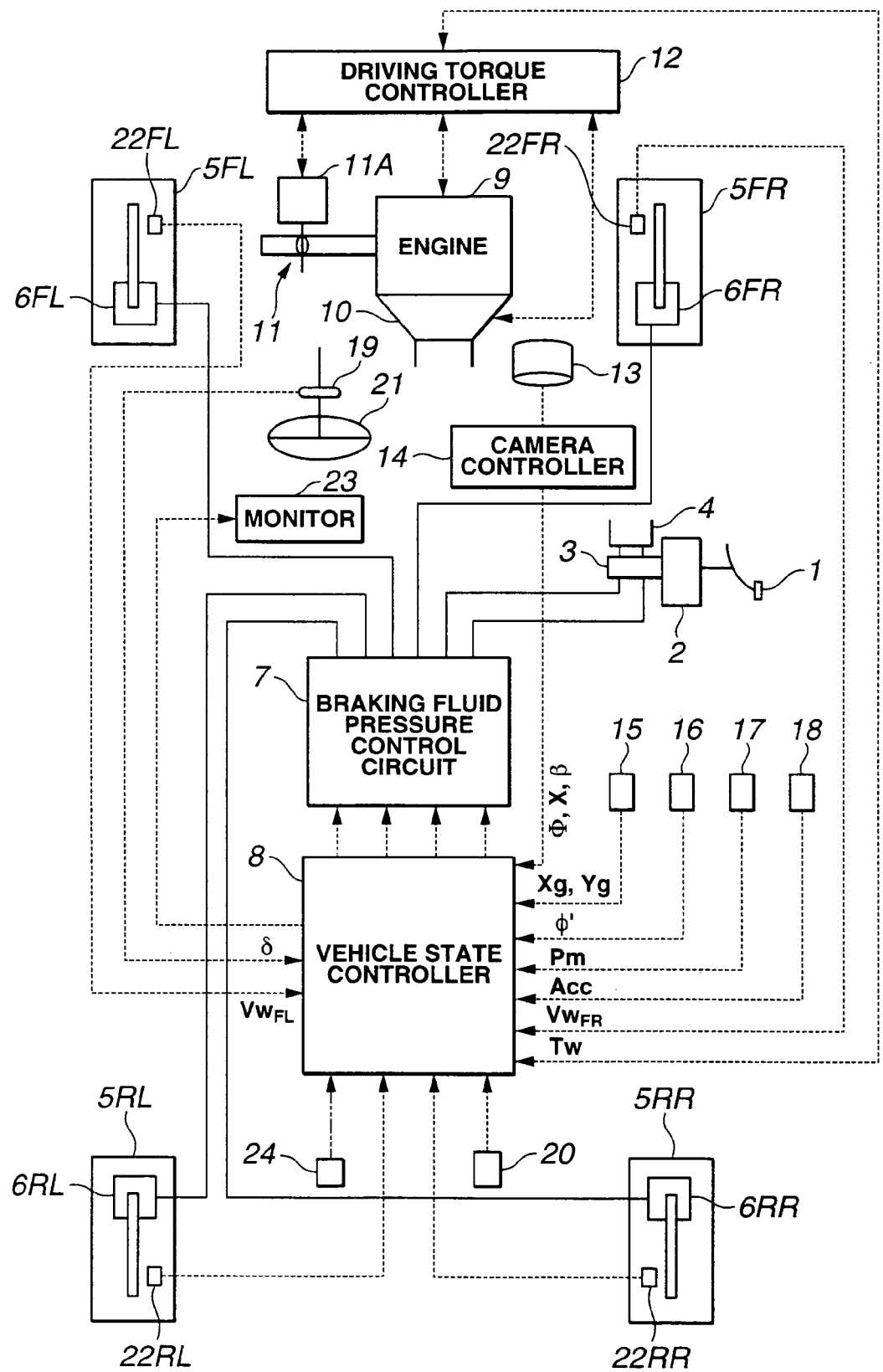
FIG. 1 is a rough configuration view of an automotive vehicle to which a lane keep control apparatus in a first preferred embodiment according to the present invention is applicable.

FIG. 1 shows an automotive vehicle to which a lane keep control apparatus in a first preferred embodiment according to the present invention is applicable. This vehicle is a rear wheel driven vehicle (FR car) in which an automatic transmission and a conventional differential gear are mounted. A brake device can control a braking force (braking liquid pressure) of each of left and right road wheels between front and rear road wheels, independently of each other. In FIG. 1, a reference numeral 1 denotes a brake pedal, a reference numeral 2 denotes a booster, a reference numeral 3 denotes a master cylinder, and a reference numeral 4 denotes a reservoir. Ordinarily, a braking fluid pressure boosted by means of master cylinder 3 in accordance with a depression depth of brake pedal 1 by the vehicle driver is supplied to each wheel cylinder of front left and right road wheels 5FL and 5FR and rear left and right road wheels 5RL and 5RR. A braking fluid pressure control circuit 7 is intervened between master cylinder 3 and each wheel cylinder 6FL through 6RR. The braking fluid pressure of each wheel cylinder 6FL, 6FR, 6RL, and 6RR can individually be controlled within the braking fluid pressure control circuit 7.

Braking fluid pressure control circuit 7 is a utilization of the braking fluid pressure control circuit used in, for example, an antiskid control or a traction control. In this embodiment, the braking fluid pressure of each wheel cylinder 6FL, 6FR, 6RL, and 6RR can solely be controlled (increased or decreased) independently of each other. The braking fluid pressure of each wheel cylinder 6FL through 6RR is controlled in accordance with a braking fluid pressure command value from a vehicle state controller 8 as will be described later.

In addition, this vehicle is provided with a driving torque controller 12 which controls a driving state of engine 9, a selection gear ratio of an automatic transmission 10, and a throttle opening angle of a throttle valve 11 via a throttle actuator 11A, thus, to control a driving torque to rear road wheels 5RL and 5RR which are driven wheels. The driving state control of engine 9, can be carried out, for example, by controlling a fuel injection quantity and an ignition timing and, simultaneously, controlling the opening angle of throttle valve 11. It is noted that it is possible for driving torque controller 12 to solely control drive torques of rear road wheels 5RL and 5RR which are driven wheels and to control driven wheel torques by referring to the driving torque command value when a command value of the driven torque from controller 8 as described before.

An CCD (Charge Coupled Device) camera (monocular camera) 13 and a camera controller 14 are disposed in the vehicle as a vehicular surrounding sensor used to detect a position of the vehicle within a traveling traffic lane for making a traveling traffic lane deviation prevention determination of the vehicle. This camera controller 14 detects the traffic lane within which the vehicle is traveling by detecting lane markers such as white lines from a photographed image located before the vehicular front direction caught (or trapped) by monocular camera 13. Furthermore, camera controller 14 outputs a yaw angle Φ of the host vehicle with respect to the traveling traffic lane (a direction of the host vehicle with respect to the traffic lane), a lateral displacement X from a traffic lane center, and a curvature β of the traveling traffic lane. (and a traffic lane line width L).

Furthermore, in order to prepare against a case where the lane markers cannot be detected due to a bad weather or so on, camera controller 14 outputs a recognition determination signal Fcr. In a case where the lane markers can appropriately be detected, recognition determination signal Fcr is set to "1" (Fcr=1). If the lane markers cannot appropriately be detected, recognition determination signal Fcr is reset as (Fcr=0) and camera controller 14 outputs zero yaw angle Φ of the host vehicle, zero lateral displacement X of the host vehicle from the traffic lane center, and zero curvature β of the traffic lane. It is noted that this camera controller 14 detects the traveling traffic lane using a traveling traffic lane detection area (forward direction of the vehicle) to detect the lane markers and calculates respective data for the detected traveling traffic lane. For the detection of the traveling traffic lane, a technique described in a Japanese Patent Application First Publication No. Heisei 11-296660 published on Jul. 6, 1999 can be used.

Specifically, the lane markers such as white lines located at both sides of the traffic lane on which the vehicle is traveling are detected and the traffic lane on which the vehicle is traveling is detected using the lane markers. If the lane markers such as white lines are detected (scanned) over the whole image area photographed, the calculation load is large and it takes a lot of time. A further small detection area (so-called, a window) is set on a region on which there is a possibility that one of the lane markers is present. In general, if the direction of the host vehicle with respect to the traffic lane is varied, the position of the lane marker displayed on the image screen is changed. Hence, in the above-described Japanese Patent Application First Publication, for example, the direction of the host vehicle with respect to the traffic lane is estimated from the steering angle δ and the detection region is set on the region on which the lane marker within the image screen would be displayed. Then, for example, such a filtering process as making a boundary between the lane marker and road surface conspicuous is carried out, a straight line which most likely be the boundary between the lane marker and the road surface is detected and a single point (lane marker candidate point) on the straight line is detected as a representative position of the lane marker. If the lane marker candidate point thus obtained is continued for each window, a future traffic lane evolving in front of the host vehicle can be detected.

In addition, detection signals of an accelerator sensor 15 to detect longitudinal acceleration Xg developed on the vehicle and to detect lateral acceleration Yg developed on the vehicle, a yaw rate sensor 16 to detect a yaw rate φ' developed on the vehicle, a master cylinder pressure sensor 17 to detect an output pressure of master cylinder 3, so-called, a master cylinder pressure Pm, an accelerator opening angle sensor 18 to detect an accelerator opening angle Acc, a steering angle sensor 19 to detect a steering angle δ of a steering wheel 21 as a steering quantity detecting section (means), road wheel velocity sensor 22FL, 22FR, 22RL, and 22RR to detect revolution speed Vwi (i=FL through RR) of each road wheel 5FL, 5FR, 5RL, and 5RR, and a direction indicating switch 20 to detect a direction indicating operation by means of a direction indicator are outputted to vehicle state controller 8. Vehicle state controller 8 also receives the signals of yaw angle Φ of the vehicle with respect to the traffic lane detected by means of camera controller 14, of lateral displacement X from the center of the traffic lane detected thereby, curvature β of the traffic lane detected thereby, traffic lane width L detected thereby, and drive torque Tw controlled by means of driving torque controller 12. It is noted that, in a case where a left-and-right directivity is present in the detected traveling state data, the left direction is a positive direction. That is to say, yaw rate φ', lateral acceleration Yg, and yaw angle Φ indicate positive during the left turn and lateral displacement X indicates the positive value when the vehicle is deviated toward the left direction from the center of the traveling traffic lane.

In addition, a monitor 23 for an alarm to produce a warning to the vehicle driver is installed in a front portion of a driver's seat when vehicle state controller 8 detects the deviation of the vehicle from the traveling traffic lane. This monitor 23 incorporates a speaker to produce a voice or buzzer sound thereinto. Next, a traffic lane deviation preventive control processing carried out by vehicle state controller 8 will be described with reference to a flowchart of FIG. 2. This lane deviation preventive control process is executed by a timer interrupt processing, for example, for each of predetermined sampling periods ΔT. It is noted that this flowchart of FIG. 2 is not provided for communication purpose but the information obtained by the calculation processing is updated and stored into a temporary storing device and read out from a temporary storing device.

Figure 2:
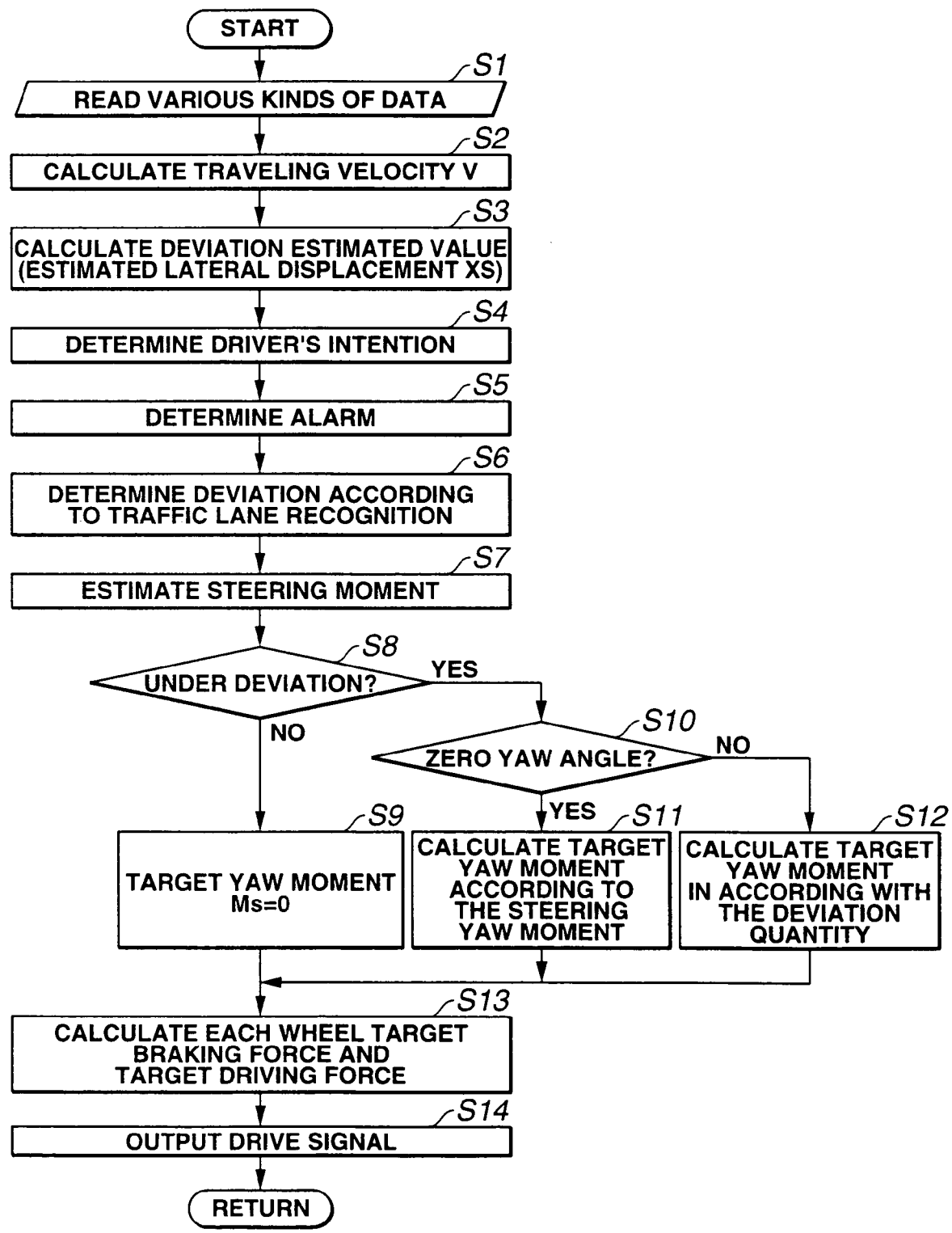
FIG. 2 is an operational flowchart representing a traffic lane deviation preventive control process executed by a vehicle state controller shown in FIG. 1.

At a step S1 of FIG. 2, various kinds of data are read from each sensor, camera controller 14, and driving torque controller 12. Specifically, vehicle state controller 8 reads longitudinal acceleration Xg, lateral acceleration Yg, yaw rate φ', respective road wheel velocities Vwj (j=FR, FL, RL, and RR), accelerator opening angle Acc, direction indication switch signal, master cylinder pressure Pm, steering angle δ, direction indicator switch signal, each thereof being detected by means of the corresponding sensor, drive torque Tw from driving torque controller 12, vehicular yaw angle Φ of camera controller 14 with respect to traveling traffic lane, lateral displacement X from the center of the traffic lane, curvature β of the traveling traffic lane, recognition determining signal Fcr, and a driving torque Tw from driving torque controller 12.

At the next step S2, vehicle state controller 8 calculates a vehicular velocity V of the host vehicle from an average value of front left and right road wheel velocities $VW_{FL}$ and $VW_{FR}$ which are non-driven wheels read at step S1. It is noted that the traveling velocity V is calculated on the basis of front left and right road wheel velocities $VW_{FL}$ and $VW_{FR}$. However, the traveling velocity V may be used from an estimated vehicle body velocity estimated during the processing of an anti-skid control in a case where ABS (Anti-lock Brake System) control section (means) is installed in the host vehicle to perform an anti-skid control.

At the next step S3, vehicle state controller 8 calculates a future estimated lateral displacement XS, namely, deviation estimated value. Specifically, on the basis of vehicle yaw angle Φ read at step S1, lateral displacement X from the center of the traffic lane read at step S2, and curvature β of the traffic lane, and vehicle velocity V of the vehicle calculated at step S2, deviation estimated value XS is calculated which is the future estimated lateral displacement in accordance with the following equation (1). XS=Tt×V×(Φ+Tt×V×β)+X . . . (1). In equation (1), Tt denotes a vehicular head time for calculating a forward gazing distance, and if head time Tt is multiplied with vehicular velocity V, the result is the forward gazing distance. As will be described later, in this embodiment, when an absolute value of future estimated lateral displacement XS is equal to or larger than a predetermined lateral displacement limitation value, vehicle state controller 8 determines that there is a possibility that the vehicle will deviate from the traveling traffic lane or the vehicle has a traffic lane deviation tendency. It is noted that if recognition determining signal Fcr=0, estimated lateral displacement XS is set as XS=0.

Next, the routine goes to a step S4. At step S4, vehicle state controller 8 determines the driver's intention of whether the driver tries to change the traveling traffic lane. In this embodiment, as will be described later, a controlled variable of the deviation control so as not to disturb the avoidance operation in a case where an obstacle is present in front of the vehicle is made small. However, in FIG. 2, the deviation control is limited even in a case where an intentional traffic lane change occurs according to the driving operation by the driver irrespective of the presence or absence of an obstacle located in front of the vehicle. Specifically, if the direction of the direction indicator switch signal read at step S1 is the same as lateral displacement X of the host vehicle from the center of the traveling traffic lane read at step S1 or the deviation direction obtained from future estimated lateral displacement XS obtained as the deviation estimated value calculated at step S3, traffic lane change determining flag $F_{LC}$ is set to "1" determining that it is the intentional lane change. On the other hand, if the direction indicator switch signal is turned off, namely, direction indicator switch 20 is not operated but the driver steers the vehicle in the deviation direction so that steering angle δ and a steering angular velocity δ' are equal to or larger than respective predetermined values, vehicle state controller 8 determines that the driver has the intention to perform the traffic lane change and sets traffic lane change determination flag $F_{LC}$ is set to 1 ($F_{LC}$=1). In other cases, traffic lane change determination flag $F_{LC}$ is set to "0". If the direction of the direction indicator switch signal is the same as the deviation direction of the host vehicle and traffic lane change determination flag $F_{LC}$ is set to "1", the set state is maintained for a predetermined time (for example, four seconds) even after it becomes a state in which such a condition that traffic lane change determining flag is set to "1" ($F_{LC}$=1) is not satisfied. This is presumed that direction indicator switch 20 is released during the actual traffic lane change. In this case, the deviation preventive control is not intervened.

At the next step S5, vehicle state controller 8 determines if the host vehicle has the tendency of the deviation from the traveling traffic lane. Specifically, vehicle state controller 8 determines this tendency according to a result of comparison between future estimated lateral displacement XS as the deviation estimated value calculated at step S3 and an alarm determination threshold value Xw. This alarm determination threshold value Xw is interlocked with lateral displacement limitation value Xc which is the deviation determination threshold value and is calculated in the following equation (2).

$$Xw=Xc-Xm \qquad (2).$$

It is noted that, in equation (2), Xm denotes a margin (constant) from a time at which the alarm is produced to a time at which the deviation preventive control is activated. Then, vehicle state controller 8 determines that it is necessary to issue the alarm when traffic lane change determination flag $F_{LC}$ set at step S4 is $F_{LC}$=0 and in a case of either XS>Xw (left deviation time) or XS<−Xw (right deviation time) and monitor 23 is operated to issue the alarm. Once the alarm is issued, the alarm is halted when the following condition is satisfied. That is to say, either XS<Xw−Xh (left deviation time) or XS≧−(Xw−Xh) (right deviation time). It is noted that Xh is a hysterisis to avoid a hunting of the alarm. Then, the routine goes to a step S6. At step S6, vehicle state controller 8 carries out a traffic lane deviation determination according to the recognition of the traffic lane. This traffic lane deviation determination is made according to a result of comparison between the future estimated lateral displacement XS as the deviation estimated value calculated at step S3 and the lateral displacement limitation value Xc. Specifically, if estimated lateral displacement XS≧lateral displacement limitation value Xc, vehicle state controller 8 determines that the vehicle is deviated in the leftward direction and sets deviation determination flag $F_{LD}$ is set to "1" ($F_{LD}$=1). On the other hand, if XS≦−Xc, vehicle state controller 8 determines that the vehicle is deviated toward the rightward direction and sets deviation determination flag $F_{LD}$ to −1 ($F_{LD}$=−1). Furthermore, if neither XS≧Xc nor XS≦−Xc is satisfied, vehicle state controller 8 determines that the vehicle is not deviated and sets deviation determination flag $F_{LD}$ to zero ($F_{LD}$=0).

It is noted that lateral displacement limitation value Xc is a constant and either one of a subtraction value of a half value of a vehicular width L0 of the vehicle traffic lane width L or, for example, 0.8 meters [m] which is smaller than the other can be used for lateral displacement limitation value Xc. Traveling traffic lane width L may be a fixed value (for example, a traffic lane width of a Japan's express way of 3.35 meters [m]) or may be modified according to a traveling road by retrieving the position of the host vehicle through a navigation system as the traffic lane width information from a road map data. In addition, in a case where, by means of an infrastructure system, a distance to the traffic lane in the deviation direction detected on the basis of markers and so forth buried into the road "L/2−XS" can be obtained through a road-to-vehicle information, this information may be used as traffic lane width L.

Thereafter, the deviation determination and the correction of road surface end determination are carried out according to traffic lane change determination flag $F_{LC}$ set at step S4. In details, in a case where traffic lane change determination flag is $F_{LC}=1$, the deviation preventive control is not executed. Hence, even if according to the above determination deviation determination flag $F_{LD}$ is "1 or −1", these are modified to "0". When the anti-skid control (ABS), vehicular dynamic control (VDC), or driving force control (Traction Control System 'TCS')) is activated, the deviation preventive control is not carried out. Therefore, deviation determination flag $F_{LD}$ may forcefully be reset to "0".

At the next step S7, vehicle state controller 8 estimates a steering moment Mos in the direction which is developed according to the steering. In this embodiment, vehicle state controller 8 calculates steering moment Mos on the basis of a function $f(\delta, V)$ which is established between steering angle $\delta$ and traveling velocity V of the host vehicle according to steering angle $\delta$ only when deviation determination flag $F_{LD}$ is "1 or −1". It is noted that steering angle $\delta$ is positive when it is in a counterclockwise direction. In a case where deviation determination flag $F_{LD}$ is 0 ($F_{LD}=0$) so that there is no tendency of the deviation, steering moment Mos=0. In a case where deviation determination flag is 1 ($F_{LD}=1$), namely, when the deviation is in the leftward direction, steering moment Mos=f($\delta$, V) when steering angle is $\delta \geq 0$ and the leftward steering is carried out and Mos=0 when steering angle $\delta$ is <0 and the steering in the rightward direction which is reverse to the deviation direction. Similarly, steering moment Mos=f($\delta$, V) when steering angle $\delta$ is $\delta<0$ and the steering in the rightward direction is carried out and steering moment Mos=0 when steering angle $\delta \geq 0$ and steering in the leftward direction is carried out.

Figure 3:
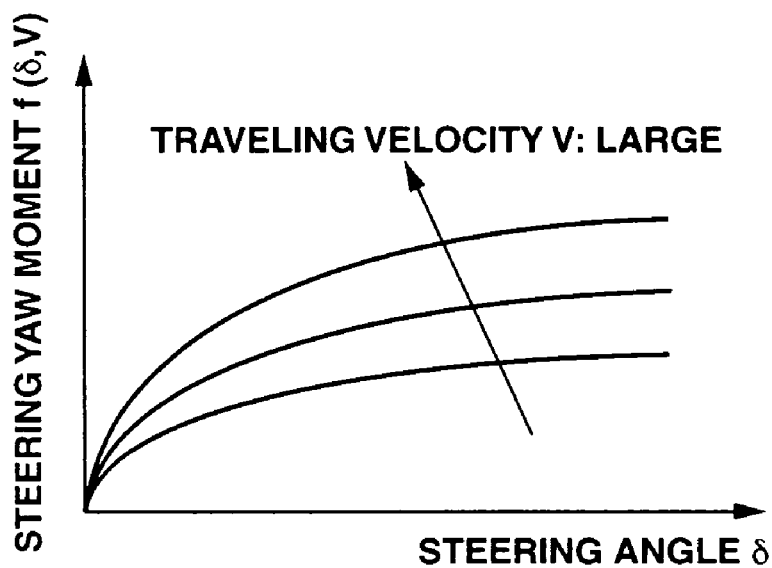
FIG. 3 is a control map used in the traffic lane deviation prevention control process shown in FIG. 2.

It is noted that function f($\delta$, V) is a function to calculate a yaw moment developed steadily when the vehicle is traveling at the traveling velocity V and steering angle $\delta$ and is calculated using a vehicle model with the vehicular specifications taken into consideration. However, for example, with a control map already prepared as shown in FIG. 3, the steering moment may be specified corresponding to steering angle $\delta$ from the control map shown in FIG. 3. It is noted that, in FIG. 3, a lateral axis denotes steering angle $\delta$, a longitudinal axis denotes steering moment f($\delta$, V), the steering moment being increased as steering angle $\delta$ is increased and being set such that, in a region in which steering angle $\delta$ is small, a variation rate of steering angle $\delta$ becomes larger. In addition, as traveling velocity V becomes large, steering yaw moment is set to be large.

At the next step S8 in FIG. 2, vehicle state controller 8 determines whether the deviation occurs. Specifically, if deviation determination flag is $F_{LD}=0$ and the vehicle is determined not to be deviated, the routine goes to a step S9. If deviation determination flag $F_{LD} \neq 0$ and the vehicle is determined to be deviated from the traffic lane, the routine goes to a step S10. At step S9, the vehicle is not deviated from the traffic lane and it is not necessary to perform the control of the traffic lane deviation. Hence, a target yaw moment Ms is set as Ms=0. On the other hand, at step S10, vehicle state controller 8 determined whether yaw angle $\Phi$ is a value of zero or approximately zero and is a state in which yaw angle can be deemed to be zero. If yaw angle $\Phi$ is substantially zero, the routine goes to a step S11. If yaw angle $\Phi$ is not substantially zero, the routine goes to a step S12. At step S11, since yaw angle $\Phi$ is a value of zero or substantially zero and the traffic lane deviation control permits the determination that yaw angle $\Phi$ becomes small as in the vicinity to approximately zero. Hence, vehicle state controller 8 sets target yaw moment Ms which can achieve the cancellation of only the yaw moment due to the steering without change of the yaw angle of the host vehicle with respect to the traveling traffic lane in the traffic lane deviation direction from this state not in the control according to the deviation quantity. In details, in a case where deviation determination flag $F_{LD}$ is $F_{LD}=0$ and the deviation tendency is present, vehicle state controller 8 sets a yaw moment (−Mos) which is reverse direction and whose magnitude is the same as steering moment Mos calculated at step S7 as target yaw moment Ms. On the other hand, in a case where deviation determination flag is $F_{LD}=0$ and no deviation tendency is present, target yaw moment is set as Ms=0.

On the other hand, at step S12, vehicle state controller 8 calculates the target yaw moment corresponding to the deviation quantity of the host vehicle. Vehicle state controller 8 calculates target yaw moment Ms in accordance with the following equation (3) on the basis of a deviation between deviation estimated value XS and lateral displacement limitation value Xc, viz., the deviation quantity. The yaw moment in the counterclockwise direction is positive.

$$Ms = -K1 \times K2 \times (XS - Xc) \qquad (3).$$

Figure 4:
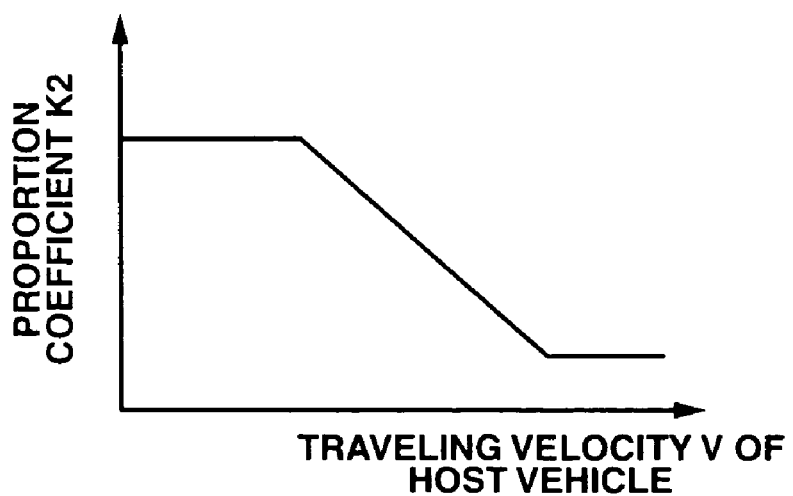
FIG. 4 is a control map representing a proportion coefficient K2.

In equation (3), K1 denotes a proportion coefficient determined from the vehicular specification and K2 denotes a proportional coefficient set in accordance with traveling velocity V of the host vehicle as shown in FIG. 4. It is noted that, in FIG. 4, its lateral axis denotes a traveling velocity V of the host vehicle and its longitudinal axis denotes proportion coefficient K2. Proportional coefficient K2 maintains a relatively large constant value in a region in which the traveling velocity V of the host vehicle is relatively small, proportion coefficient K2 is reduced in proportion to the increase in traveling velocity V, and this proportion coefficient is set to maintain a relatively small constant value in a region in which traveling velocity V of the host vehicle is relatively large. If deviation determination flag $F_{LD}$ is "0", target yaw moment is set as Ms=0. In this way, after target yaw moment Ms is set at steps S9, S11, and S12, the routine goes to step S13 in which target driving force for each road wheel and target driving forces for the driven wheels are calculated.

Specifically, the target driving force for each road wheel and the target driving forces for the driven wheels are calculated on the basis of master cylinder pressure Pm read at step S1 and target yaw moment Ms set at either step S11 or step S12. First, a target braking fluid pressure PSi for each road wheel 5FL through 5RR is calculated. Specifically, suppose that a rear road wheel purpose master cylinder pressure based on a front-and-rear driving force distribution is PmR for master cylinder pressure Pm read at step S1. At this time, if deviation determination flag is $F_{LD}=0$, target braking fluid pressures PsFL, PsFR to wheel cylinders 6FL, 6FR of front left and right road wheels 5FL, 5FR are both master cylinder pressure Pm and target braking fluid pressures PsRL, PsRR for wheel cylinders 6RL, 6RR of rear left and right road wheels 5RL, 5RR are both a rear road wheel purpose master cylinder pressure PmR. On the other hand, in a case where deviation determination flag is not $F_{LD}=0$, the case is divided according to the magnitude of target yaw moment Ms. That is to say, when an absolute value |Ms| of the target moment is less than a predetermined value Ms0, the difference is developed only for the driving forces of rear left and right road wheels. If absolute value |MS| of target yaw moment is less than a predetermined value Ms0, a difference in front left and right road wheel target braking fluid pressures ΔPsF indicates "0" and the difference in rear left and right road wheel target braking fluid pressures ΔPsR is set in the following equation (4).

$$\Delta PsR = 2 \times KbR \times |MS|/T \qquad (4).$$

Similarly, the difference in front left and right road wheel target braking fluid pressures is given in the following equation (5) and difference in rear left and right road wheel target braking fluid pressures ΔPsR is given in the following equation (6).

$$\Delta PsF = 2 \times KbF \times (|Ms|-Ms0)/T \qquad (5).$$

$$\Delta PsR = 2 \times KbR \times Ms0/T \qquad (6).$$

In equations (4) through (6), T denotes a tread (the same as the front and rear road wheels) and KbF and KbR denotes conversion coefficients for converting the braking force to the braking fluid pressure and are determined according to a braking specification. It is noted that the respective controls for the front and rear road wheels are herein carried out. However, the control for only front road wheels may be carried out. In this case, $\Delta PsF = 2 \times KbF \times |Ms|/T$. Hence, target braking fluid pressures Psi for respective wheel cylinders 6FL through 6RR when the vehicle is deviated from the traffic lane in the leftward direction and when target yaw moment Ms indicates negative, namely, with deviation determination flag $F_{LD}$ set to "1" is given in the following equation (7).

$$PsFL = Pm$$

$$PsFR = Pm + \Delta PsF$$

$$PsRL = PmR$$

$$PsRR = PmR + \Delta PsR \qquad (7).$$

On the other hand, target braking fluid pressures Psi for respective wheel cylinders 6FL through 6RR when target yaw moment Ms indicates positive, namely, deviation determination flag $F_{LD}$ is set to "−1" and the vehicle is deviated in the rightward direction is given by the following equation (8).

$$PsFL = Pm + \Delta PsF$$

$$PsFR = Pm$$

$$PsRL = PmR + \Delta PsR$$

$$PsRR = PmR \qquad (8).$$

In this embodiment, an output of engine is throttled so that a vehicular acceleration cannot be made even if an acceleration operation is carried out when deviation determination flag $F_{LD} \neq 0$ and deviation preventive control is carried out. In other cases, in accordance with the acceleration operation by the driver, only the drive torque is resulted which accelerates the vehicle in accordance accelerator opening angle Acc. That is to say, during the active deviation preventive control, a value of the subtraction of the value corresponding to the front and rear road wheel target braking fluid pressure differences ΔPSF and ΔPsR from the value according to the accelerator opening angle Acc read at step S1 is target driving torque TrqDS. The value according to the accelerator opening angle Acc is the drive torque to accelerate the vehicle in accordance with the accelerator opening angle Acc. The value corresponding to the front and rear road wheel target braking fluid pressure differences ΔPSF, ΔPsR are the braking torque developed due to target braking fluid pressure differences ΔPSF, ΔPsR. Hence, during the deviation preventive control, the engine torque is reduced by the braking torque developed by this deviation preventive control. It is noted that, herein, the deviation preventive control has a higher priority than the accelerator operation by the driver. However, the higher priority is placed on the driver's accelerator operation and, for example, a controlled variable of the deviation preventive control according to the accelerator opening angle may be small. Then, the routine goes to a step S14. At step S14, target braking fluid pressures for the respective road wheels calculated at step S13 are outputted to braking fluid pressure control circuit 7 and the target drive torque for each of the driven wheels is outputted to drive torque control unit 12 and the routine returns to the main program.

Figure 5A:
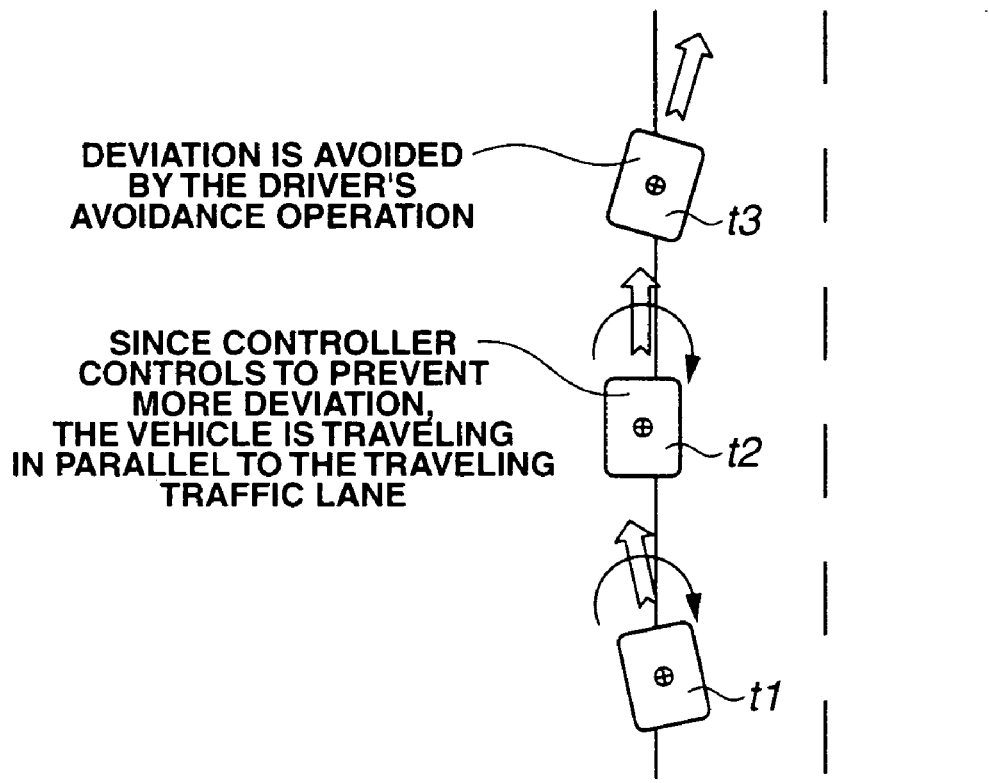
FIGS. 5A and 5B are explanatory views for explaining an operation of the lane keep control apparatus shown in FIG. 1.

Next, an operation of the first embodiment will be described below. Suppose now that the vehicle is traveling on the center of the traveling traffic lane. In this case, deviation estimated value XS calculated at step S3 satisfies neither XS>Xw nor XS<−Xw. Hence, no alarm is issued at step S5. Since neither XS≧Xc nor XS≦−Xc, deviation determination flag is set as $F_{LD}=0$ at step S6. In addition, the estimation of steering moment is carried out on the basis of the instantaneous steering angle δ at step S7. At this time, since the traffic lane deviation is not carried out, the routine goes from step S8 to step S9. Since deviation determination flag $F_{LD}=0$ and the vehicle is not in the traffic lane deviation tendency, target yaw moment Ms is set as Ms=0. Hence, the yaw moment due to the deviation preventive control is not developed. In details, in a case where the vehicle is not in the traffic lane deviation tendency, the yaw moment due to the deviation preventive control is not acted so that the vehicle behaves according to the driving operation of the driver. Then, suppose that, from this state, the vehicle tends to be deviated, for example, in the leftward direction and deviation estimated value XS is increased, the alarm is developed (step S5) at a time point when deviation estimated value XS is XS>Xw (step S5) so that the driver receives the alarm that the host vehicle has the deviation tendency. At this time point, since deviation determination flag is set as $F_{LD}=0$ at step S6, the yaw moment due to the deviation preventive control is not developed. At this time, in a case where the driver operates direction indicator switch 20, traffic lane change flag $F_{LC}$ at step S4 is set as $F_{LC}=1$. Hence, the alarm is not developed in a state wherein the traffic lane change intention is present by the driver. Then, from the state in which the vehicle tends to be deviated in the leftward direction, deviation estimated value XS is increased so that XS≧Xc. At this time, deviation determination flag $F_{LD}$ is set to $F_{LD}=1$ (step S6) Therefore, the routine goes from step S8 to step S12 via step S10 and vehicle state controller 8 calculates target yaw moment Ms in accordance with the instantaneous estimated lateral displacement XS. Thus, as shown in a state t1 of FIG. 5A, the yaw moment which can suppress the deviation quantity of the host vehicle at the present time point is developed. The direction of the host vehicle with respect to the traveling traffic lane is controlled to be directed in an inside direction of the traffic lane so that the traffic deviation can be suppressed.

As described above, the development of target yaw moment Ms in accordance with the deviation quantity of the vehicle causes the direction of the host vehicle with respect to the traveling traffic lane, viz., yaw angle is decreased. If this gives substantially zero, the routine goes from step S10 to step S11. At this time, if the driver does not operate steering wheel 21, in other words, if steering angle δ is δ≧0 and the driver operates the counterclockwise steering, vehicle state controller 8 calculates steering moment Mos according to steering angle δ and traveling velocity V. Then, the moment having the same magnitude as steering moment Mos and which is reverse to the steering moment Mos are set as target moment Ms.

Hence, the movement is developed in the direction which cancels the yaw moment developed due to steering angle δ at the present time. At this time, since the moment having the same magnitude as the yaw moment developed due to steering angle δ is developed. Hence, steering moment due to steering angle δ is canceled. Actually, the steering having the magnitude of δ is carried out but the host vehicle is in an equivalent state in which the moment is not acted. As shown in a state t2 of FIG. 5A, the yaw angle with respect to the traveling traffic lane of the host vehicle is maintained at the present time, viz., the present state is maintained at substantially zero. Hence, the host vehicle is traveling aside of a road shoulder of the traveling traffic lane in parallel to the traffic lane and, although the vehicle is traveling aside of the road shoulder, the traffic lane deviation is not carried out.

Then, the host vehicle is traveling aside of the road shoulder without the traffic lane deviation. At this time, while deviation estimated value XS is equal to or larger than lateral displacement limitation value Xc, the routine of FIG. 2 is transferred from step S8 to step S11 via step S10. Then, since target yaw moment Ms according to the steering moment and which can cancel the steering movement is developed, the host vehicle is not deviated from the traveling traffic lane. However, during this time, since deviation estimated value XS is in excess of alarm determination threshold value Xw, the alarm is continued to be produced. Hence, although the traffic lane deviation does not occur, the driver can recognize that the vehicle has the deviation tendency from the traveling traffic lane. Then, upon receipt of this alarm, the driver steers the vehicle in the rightward direction. At this time, upon receipt of the alarm, the driver steers steering wheel 21 in the rightward direction. Then, while steering angle is δ≧0, the traffic lane deviation direction, namely, the leftward moment is developed. Target moment Ms which can resist this moment is developed. Consecutively, the vehicle travels on a road surface which is parallel to the traveling traffic lane. Than, if the steering angle is δ<0, the moment in the traffic lane deviation direction is not developed. Hence, target moment is set to Ms=0 so that the moment according to the deviation preventive control is not developed. Therefore, the moment in the rightward direction according to steering angle δ by the steering operation of the driver is developed. Then, as shown in a state t3 shown in FIG. 5A, the vehicle is directed toward the center direction of the traffic lane. Thus, the steering operation of the driver causes the tendency of the traffic lane deviation to be avoided.

If the traffic lane deviation direction tendency of the host vehicle is recovered and deviation estimated value XS is below lateral displacement limitation value Xc, vehicle state controller 8 determines that there is no traffic lane deviation tendency and the deviation determination flag is set to $F_{LD}=0$. Hence, since the vehicle is not in the traffic lane deviation, the routine goes from step S8 to step S9 and target moment Ms is set as Ms=0. Therefore, after the traffic lane deviation is recovered, the control by means of the deviation preventive control is not carried out. Hence, irrespective of the steering operation by the driver, the yaw moment is not developed. As described above, in a case where vehicle state controller 8 detects that the vehicle has the tendency of deviating from the traffic lane, vehicle state controller 8 recovers the yaw angle with respect to the traveling traffic lane by controlling the vehicle in the direction toward which the deviation in the direction to avoid the deviation in accordance with the deviation quantity. After the yaw angle is parallel to the traveling traffic lane, the control to maintain this state is carried out and the control for the vehicle to be recovered to the center of the traffic lane is not carried out. Thus, while avoiding the traffic lane deviation, the deviation avoidance operation can be carried out for the driver. Hence, the driver's tendency to excessively resort to the traffic lane deviation control can be prevented.

Figure 5B:
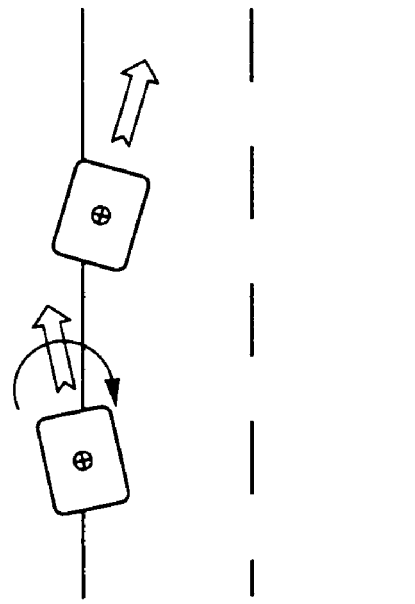

It is noted that, as shown in FIG. 5B, when the vehicle detects the tendency of traffic lane deviation, such a control as to transfer the host vehicle to the center of the traffic lane is carried out. In this case, even if the driver does not carry out the deviation avoidance steering, the traffic lane deviation can be prevented to some degree and a chance to carry out the avoidance control is often not given. However, as described above, in the traffic lane deviation control, the control to a degree that the vehicle is deviated to some degree is carried out. Thus, the driver is in a state where the operation for the vehicle to return to the center position of the traffic lane is necessarily carried out so that the vehicle state controller 8 can recognize the driver that the vehicle has the tendency of being deviated from the traffic lane and the avoidance operation of the traffic lane can be executed. At this time, target yaw moment Ms is developed in accordance with the deviation quantity. Thus, after steering yaw angle Φ becomes substantially zero, steering moment on the basis of steering angle δ is calculated so that target yaw moment Ms which can cancel the steering moment is developed. Hence, before the yaw moment along with the steering is actually developed on the vehicle, the magnitude of the yaw moment is predicted and target yaw moment Ms in the direction to cancel the actual yaw moment can be developed. Thus, irrespective of the steering state, the target yaw moment can stably be developed. In addition, if the driver should steer steering wheel 21 to increase the deviation tendency, the vehicular turn toward the deviation direction can accurately and stably be prevented from occurring. In addition, at this time, on the basis of the traveling state of the vehicle, estimated lateral displacement XS which is the lateral displacement from the center of the traffic lane is estimated and is compared with lateral displacement limitation value Xc. Thus, vehicle state controller 8 determines if the vehicle has the tendency of deviation. Consequently, the determination of whether the vehicle has the tendency of deviation from the traffic lane can accurately be made. It is noted that, in the first embodiment, a case where the traffic lane deviation in the leftward direction has been described. The same action and advantage can be obtained in a case where the vehicle has been deviated from the traffic lane in the rightward direction.

Figure 6:
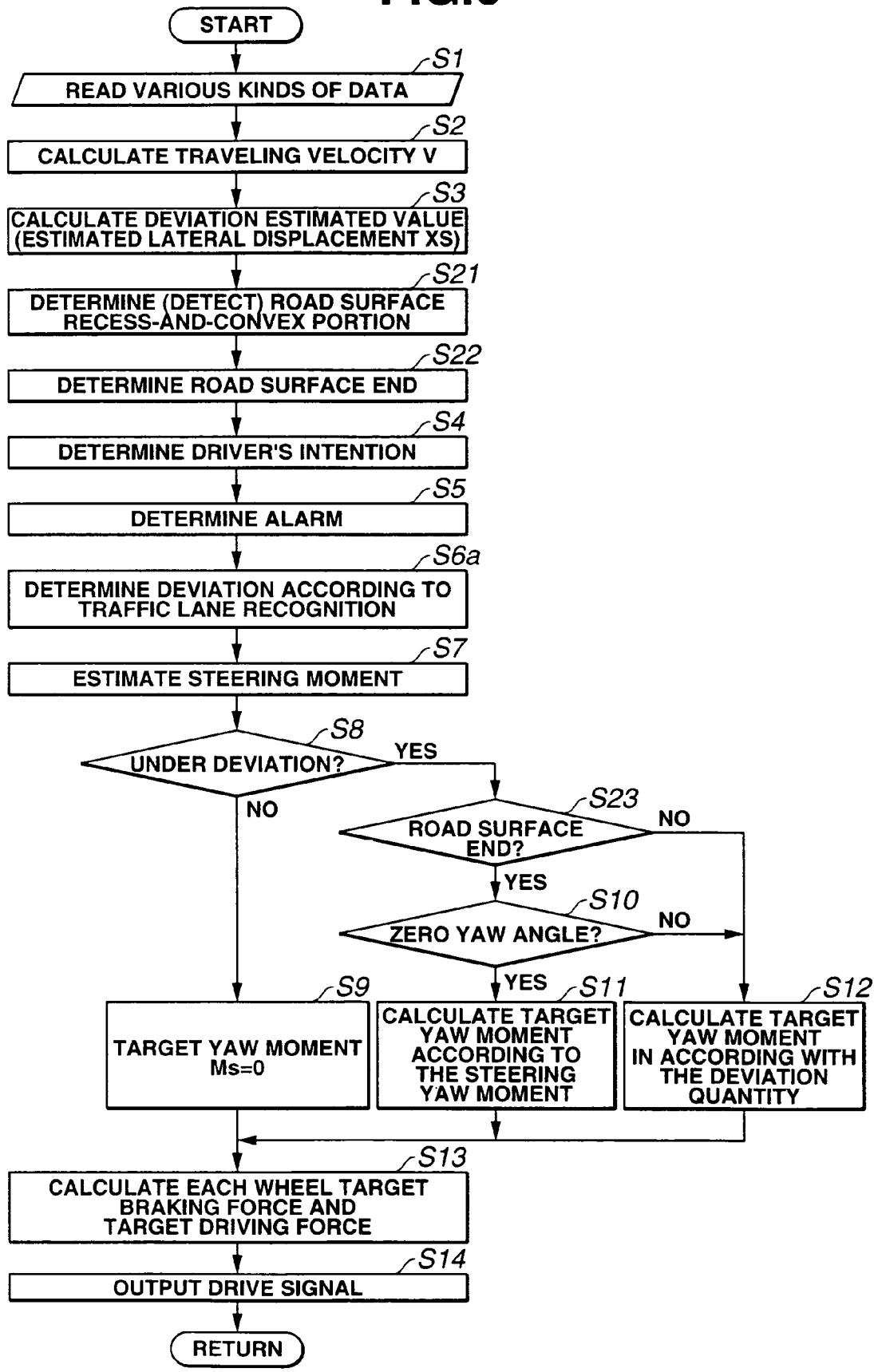
FIG. 6 is an operational flowchart representing the traffic lane deviation preventive control process executed in a second preferred embodiment of the lane keep control apparatus.

Next, a second preferred embodiment of the lane keep control apparatus according to the present invention will be described below. In the second embodiment, the processing procedure of the calculations executed by vehicle state controller 8 is only different from that of the first embodiment. The other structure of the second embodiment is the same as that of the first embodiment. Hence, the detailed description thereof of the same portion will herein be omitted. FIG. 6 shows the calculation procedure in the case of the second embodiment. The description on the same step numbers as those described in the first embodiment will herein be omitted.

Figure 7A:
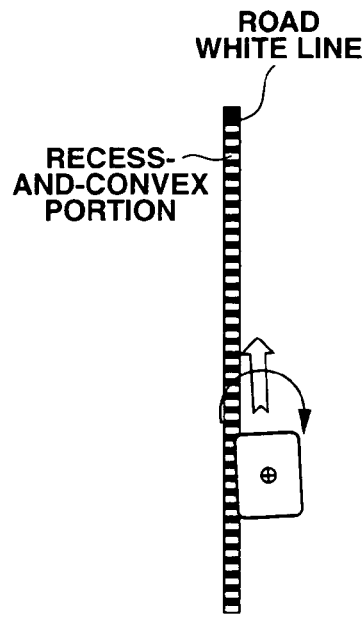
FIGS. 7A and 7B are explanatory views for explaining a ramble strip (a recess-and-convex portion) on a traveling traffic lane, FIG. 7A being a case where the recess-and-convex portion is on a traveling traffic lane block (division) line and FIG. 7B being a case where the recess-and-convex portion is located along an outside of the traffic lane block (division) line.
Figure 7B:
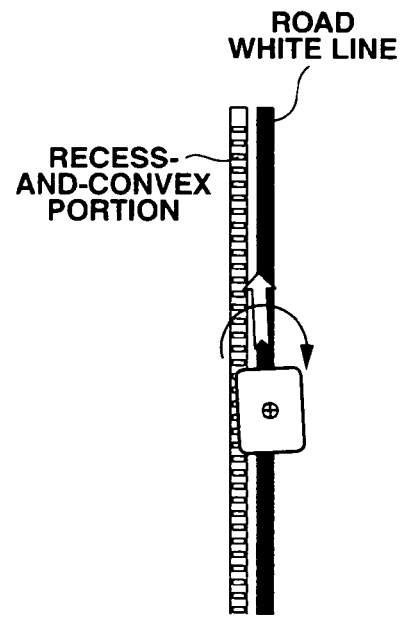
Figure 8A:
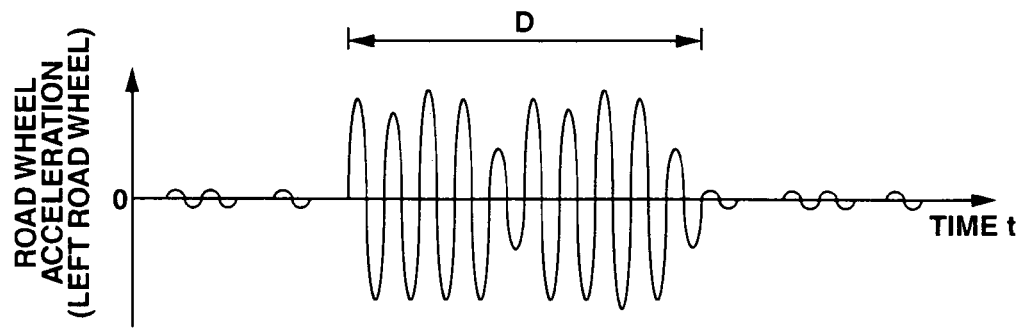
FIGS. 8A and 8B are explanatory views for explaining variation situations of a road wheel velocity.
Figure 8B:
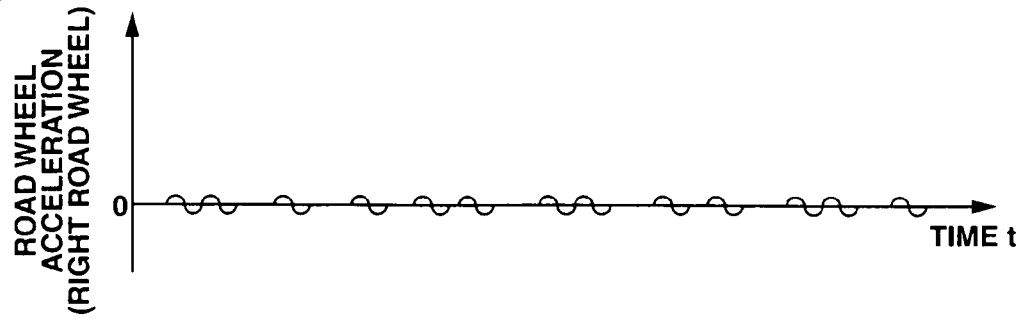

As shown in FIG. 6, the calculation procedure in the second embodiment from steps S1 through S3 is the same as the first embodiment. At step S1, vehicle state controller 8 reads each of various kinds of data from each sensor, each controller and control circuit. At step S2, vehicle state controller 8 calculates traveling velocity V from the average value of front left and right road wheel velocities VwFL and VwFR. At step S3, vehicle state controller 8 calculates future estimated lateral displacement XS as the deviation estimated value. Then, the routine goes to a step S21. At step S21, vehicle state controller 8 determines whether the vehicle is traveling on a recess-and-convex portion disposed in a proximity to a traffic lane block (division) line on a traveling road surface or on the traffic lane block line, so-called, on a ramble strip. This ramble strip is such that on the traffic lane block (division) line (road white line) as shown in FIG. 7A or in a proximity to the traffic lane block (division) line (road white line) as shown in FIG. 7B, artificial recess or convex portion is provided (hereinafter, also called a recess-and-convex portion). The ramble strip can serve for the driver to recognize the deviation from the traffic lane by developing a vibration or a sound when at least one of the vehicular road wheels are deviated on the ramble strip. Usually, this recess portion or convex portion is disposed along an equal interval between the adjacent recess or convex portion. At step S21, vehicle state controller 8 determines whether each of the road wheels is passing through the recess-and-convex portion on the basis of a variation situation of the corresponding road wheel velocity. It is noted that the recess-and-convex portion as described above is disposed at substantially constant interval. Therefore, in a case where any one of the road wheels is passed onto the recess-and-convex portion, the road wheel velocity is varied at a constant frequency period. Hence, its acceleration is also varied at a constant period as shown in an interval of D shown in FIG. 8A. FIGS. 8A and 8B show variations of road wheel velocities of left road wheel (FIG. 8A) and right road wheel (FIG. 8B) when the left road wheel is passed on the recess-and-convex portion. It is noted that a longitudinal axis of each of FIGS. 8A and 8B denotes a road wheel acceleration. The variation of the road wheel velocity is determined according to the interval between the recess-and-convex portion and adjacent recess-and-convex portion, a resolution of each of road wheel velocity sensors (for example, in the case of a coil-type road wheel velocity sensor, the resolution is dependent upon number of pulses generated per revolution, namely, the number of tooth), and characteristics of each tire and each suspension.

Figure 9A:
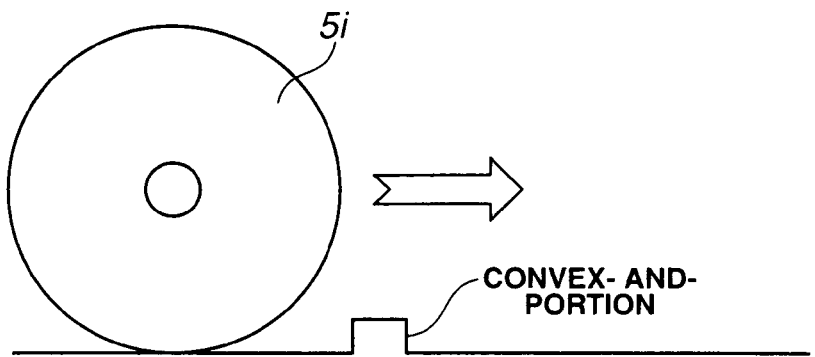
FIGS. 9A, 9B, and 9C are explanatory view for explaining variation situation of the road wheel velocity.

For example, in a case where the interval of each recess-and-convex portion is sufficiently long and the resolution of the road wheel velocity sensors is sufficiently high, a variation in the road wheel velocity (FIG. 9B) occurs for each convex portion if road wheel Si (i=FL through RR) passes the convex portion as shown in FIG. 9A. Hence, the variation occurs in the road wheel acceleration (refer to FIG. 9C). It is noted that, in FIGS. 9A through 9C, the convex portion is disposed as the recess-and-convex portion. However, in a case where the recess portion is disposed, the variation in the vehicular road wheel velocity similarly occurs when the road wheel 5$i$ passes onto the recess portion.

Figure 9B:
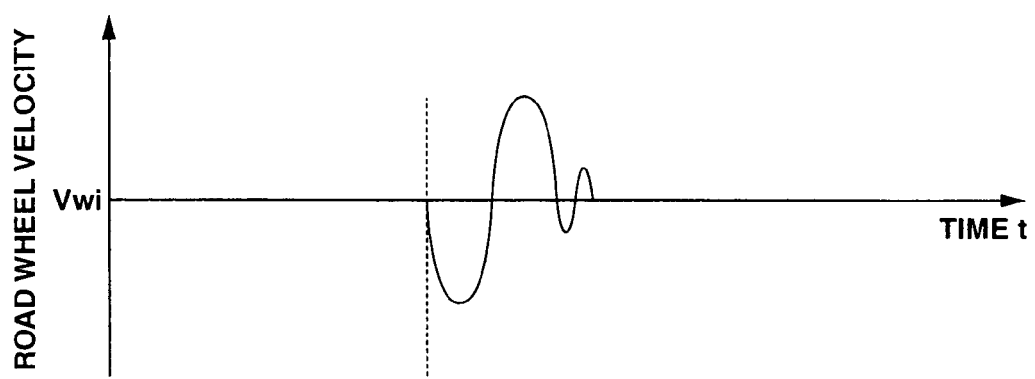
Figure 9C:
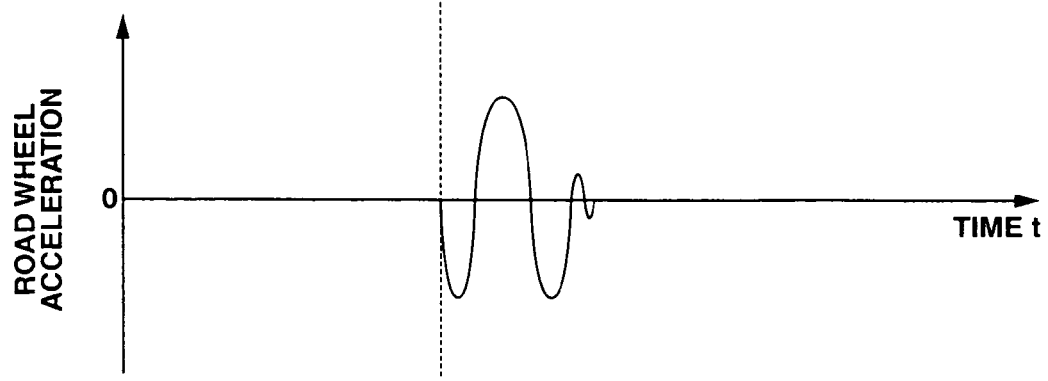

It is noted that, in the case of FIGS. 9A through 9C, the characteristics of the tires are not considered. However, in a case where the interval of convex portion (or recess portion) is narrow (short) and the traveling velocity is high, a frequency of an input from the recess-and-convex portion becomes high with respect to the resolution of road wheel velocity sensor. Hence, no variation in the road wheel velocity for each convex portion or for each recess portion is seen. In addition, due to the influence of the characteristics of the tire and suspension, a variation period of the road wheel velocity tends to become slow and a variation width tends to become small (narrow) even if the input frequency from the recess-and-convex portion is high. However, since the fact that the road wheel velocity is periodically varied remains unchanged, vehicle state controller 8 can detect that the vehicle has passed onto the artificial recess-and-convex portion on the basis of the periodical variation. It is noted that, in this embodiment, vehicle state controller 8 determines the variation of the road wheel velocity the following procedure on the basis of the variation in the road wheel acceleration. It is noted that this determination is carried out for each of front left and right road wheel.

First, road wheel acceleration dVwi is calculated on the basis of the following equation (9).

$$dVwi = Kg \times [Vwi(k-1) - Vwi(k)]/\Delta T \qquad (9).$$

It is noted that, in equation (9), i denotes a variable specifying either the front left or right road wheel (i=FL or FR), Vwi(k) denotes the presently measured road wheel velocity, Vwi(k−1) denotes a road wheel velocity measured before one calculation period, Kg denotes a unit conversion coefficient, and ΔT denotes the calculation period, for example, 20 milliseconds. Then, at a time point at which the calculated road wheel acceleration dVwi is in excess of a determination threshold value Slimt, a counter Tsi is set to an initial set value $Ts_0$ (Tsi=$Ts_0$), a road surface determination start flag is set to Frsi=1, and recess-and-convex determination timer Trsi is started. Then, for each of the calculation periods, counter Tsi is decremented and, while road surface determination start flag is Frsi=1, recess-and-convex determination timer Trsi is incremented. Then, when this counter Tsi is equal to or below threshold value TsL and larger than "0" (0<Tsi<TsL) and road wheel acceleration dVwi is again in excess of determination threshold value, viz., the variation in the road wheel acceleration occurs at a certain constant period, initial set value $Ts_0$ is set to counter Tsi. Hence, in a case where the road wheel velocity is varied periodically, viz., in the case where the road wheel acceleration is varied periodically, recess-and-convex determination timer Trsi is continued to become larger.

Figure 10:
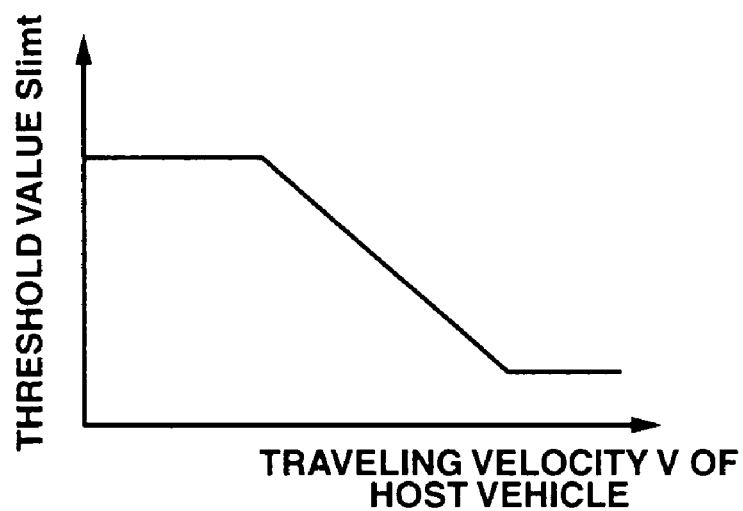
FIG. 10 is a control map used in the calculation processing shown in FIG. 6.
Figure 11:
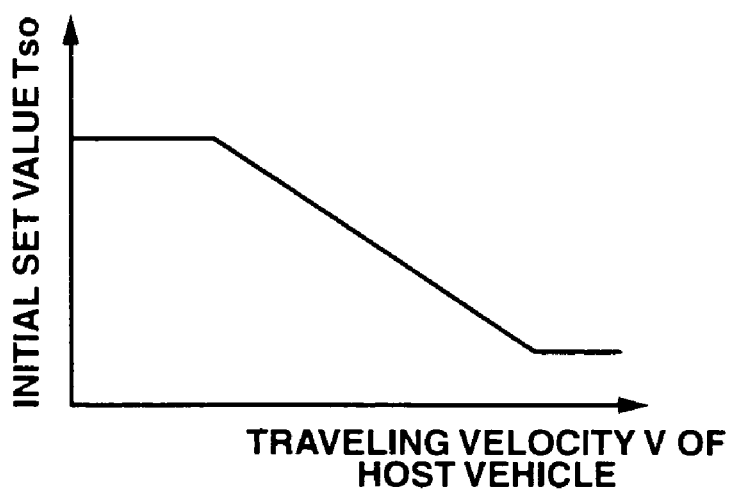
FIG. 11 is a control map used in the calculation processing shown in FIG. 6.
Figure 12A:
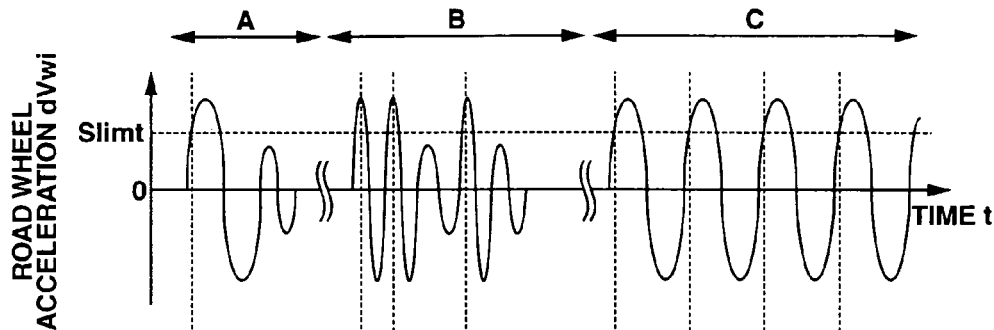
FIGS. 12A, 12B, 12C, 12D, and 12E are integrally a timing chart for explaining an operation of the second embodiment shown in FIG. 6.
Figure 12B:
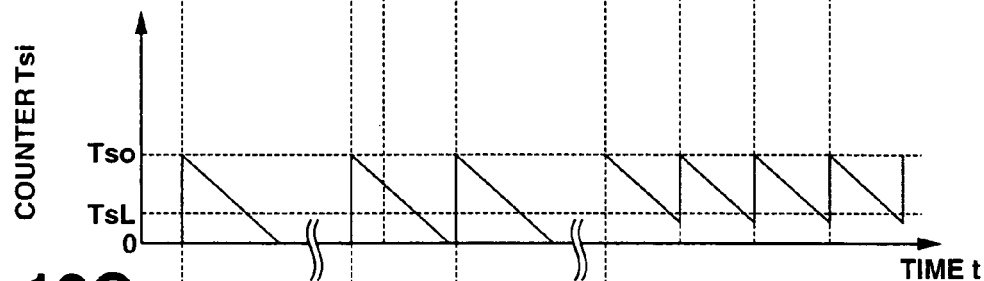
Figure 12C:
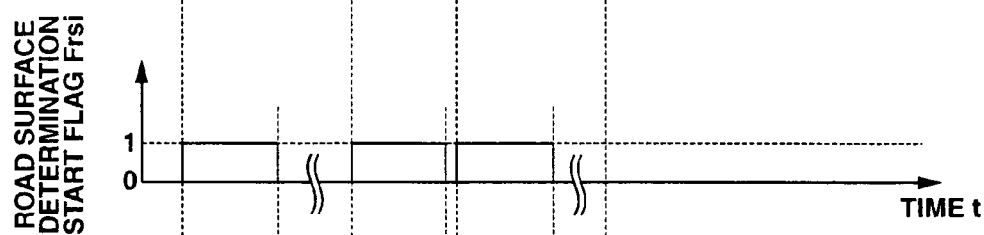
Figure 12D:
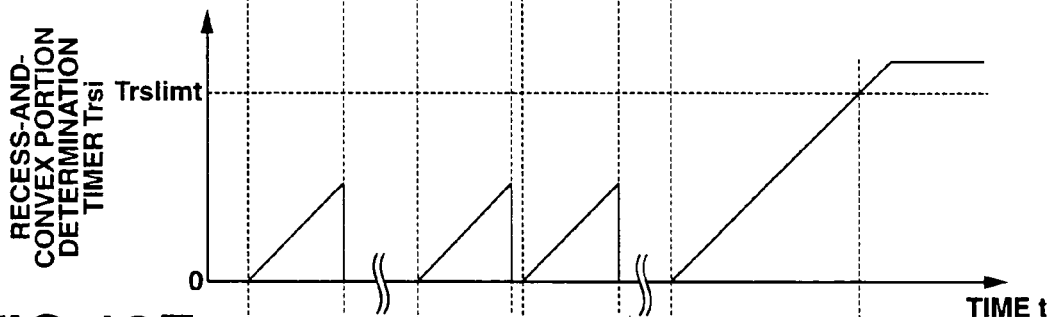
Figure 12E:
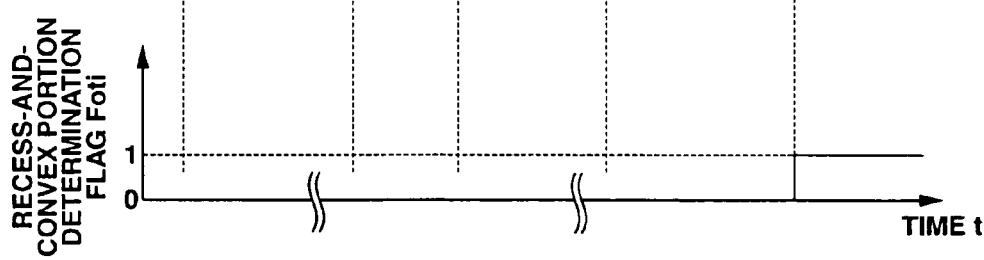

The above-described determination threshold value Slimt is set on the basis of a characteristic graph shown in FIG. 10 and initial set value $Ts_0$ is set on the basis of a characteristic graph shown in FIG. 11 according to traveling velocity V of the host vehicle. It is noted that, in FIG. 10, its lateral axis denotes traveling velocity V of the host vehicle and its longitudinal axis denotes determination threshold value Slimt. In a region in which traveling velocity V is relatively small, determination threshold value Slimt is set to a relatively large constant value. In a region in which traveling velocity V is relatively large, determination threshold value Slimt is set to a relatively small value. In addition, in FIG. 11, its lateral axis denotes traveling velocity V of the host vehicle and its longitudinal axis denotes initial set value $Ts_0$. Also in this case, in a region in which traveling velocity is relatively small, initial set value $Ts_0$ is set to a relatively large constant value. In a region in which traveling velocity V is intermediate, initial set value Ts0 is decreased in proportion to the increase in traveling velocity V. In a region in which traveling velocity V is relatively large, initial set value $Ts_0$ is set to a relatively small constant value. In details, as described above, since there is a tendency that the variation period of the road wheel velocity becomes slow and its variation width becomes small, in accordance with this tendency, determination threshold value and initial set value $Ts_0$ are set to provide the characteristics shown in FIGS. 10 and 11, respectively. When recess-and-convex determination timer is Trsi is equal to or larger than determination threshold value Trslimt, vehicle state controller 8 determines that periodical recess and convex are present and sets recess-and-convex determination flag Foti=1. In addition, when recess-and-convex determination timer is Trsi=0, vehicle state controller 8 determines that the periodical recess and convex are not present and sets recess-and-convex determination flag Foti=0. In addition, road surface determination start flag Frsi is set to 0.

In this way, as shown in an interval C shown in FIG. 12, when road wheel acceleration dVwi is larger than determination threshold value Slimt, counter Tsi is set to initial set value $Ts_0$. In addition, road surface determination start flag Frsi is set as Frsi=1. Then, recess-and-convex determination timer Trsi is operated. Thereafter, recess-and-convex determination timer Trsi is incremented for each calculation period and counter Tsi is decremented for each calculation period. Then, when counter Tsi satisfies the following condition: 0<Tsi≦TsL and road wheel acceleration dVwi becomes larger than determination threshold value Slimt, counter Tsi is again set to initial set value $TGs_0$ so that counter Tsi is started to be decremented from initial set value $Ts_0$. That is to say, with a time interval for counter Tsi from initial set value $Ts_0$ to the satisfaction of 0<Tsi≦TsL as a period, while road wheel acceleration dVwi exceeds determination threshold value Slimt, road surface determination start flag Frsi is maintained as Frsi=1 and recess-and-convex determination timer Trsi is continued to be increased. When this determination timer exceeds a threshold value Trslimt, in other words, when a state in which road wheel acceleration dVwi is in excess of threshold value Slimt is continued for an interval in accordance with threshold value Trslimt, vehicle state controller 8 determines that road wheel acceleration dVwi is periodically varied and sets recess-and-convex determination flag Foti to "1" (Foti=1).

At this time, in a case where the road wheel velocity is temporarily and largely varied as such a case where the vehicle treads on a projection on the traveling road surface, as shown in intervals of A and B of FIGS. 12A through 12E, its road wheel acceleration dVwi is accordingly varied and is in excess of determination threshold value Slimt, counter Tsi and recess-and-convex determination timer Trsi are operated. However, in the case where the road wheel acceleration dVwi is temporarily varied, it is not the case where counter Tsi satisfies the condition such that 0<Tsi≦TsL and the state in which road wheel acceleration dVwi is in excess of determination threshold value Slimt repeatedly occurs. Hence, at a time point at which counter indicates Tsi=0, road surface determination start flag is set as Frsi=0. In addition, recess-and-convex determination timer is reset as Trsi=0. Hence, recess-and-convex determination flag maintains Foti=0. Consequently, vehicle state controller 8 does not determine that the vehicle is traveling the recess-and-convex road surface.

As described above, when road wheel velocity Vwi of the host vehicle is varied at substantially a constant period (a period of a subtraction of a value which is larger than zero but is equal to or smaller than TsL from $Ts_0$), recess-and-convex determination flag is set as Foti=1. Hence, only when the road wheel is present on the road surface recess-and-convex portion such that the convex portion (or recess portion) is repeated at a constant interval of distance, vehicle state controller 8 determines that the host vehicle is traveling on the recess-and-convex portion. It is noted that in a case where vehicle state controller 8 determines that the host vehicle is traveling on the recess-and-convex portion merely when the road wheel velocity of the host vehicle is varied, vehicle state controller 8 erroneously determines that the host vehicle is traveling on the recess-and-convex portion when the vehicle merely treads on the projection. However, in this embodiment, since vehicle state controller 8 determines whether the host vehicle is traveling on the recess-and-convex portion with the periodical variation of road wheel acceleration taken into consideration. Hence, vehicle state controller 8 can accurately detect whether the host vehicle is traveling on the recess-and-convex portion of the road surface. It is noted that, in order to detect the artificial recess-and-convex portion accurately disposed along the traffic lane block line or in the proximity thereto, vehicle state controller 8 determines that the host vehicle is traveling on the recess-and-convex portion only when the periodic vibration occurs. However, at a process at which the vehicle is traveling on a road end at a step S22 as will be described later, vehicle state controller 8 determines that the vehicle is traveling on the road end only when one of the left and right road wheels is traveling on the recess-and-convex portion. Hence, vehicle state controller 8 may determine that the vehicle is traveling on the recess-and-convex portion merely when the vibration of the road wheel velocity to some degree is continued for a constant interval of time or more. Thus, vehicle state controller 8 can determine the road end (edge) even in a case where, for example, the road end is not paved on the traveling traffic lane on which no artificial recess-and-convex portion for preventing the deviation of the vehicle from the traffic lane is disposed.

Referring back to FIG. 6, after determining that the host vehicle is traveling on the recess-and-convex portion at a processing of step S21, the routine goes to a step S22. At step S22, vehicle state controller 8 determines whether the host vehicle is traveling on the road end, namely, on a left end side or on a right end side. At step S22, when vehicle state controller 8 determines that either one of the front left and right road wheels is traveling on the recess-and-convex portion and determines that the other of the front road wheels is not traveling on the recess-and-convex portion, vehicle state controller 8 determines that the host vehicle is placed at the road end at the road wheel side by which the host vehicle is traveling on the recess-and-convex portion. Accordingly, a road end determination flag Fdw is set. Specifically, in a case where front left and right road wheel recess-and-convex determination flags FotFL and FotFR are FotFL=1 and FotFR=0, vehicle state controller 8 determines that the host vehicle is placed at a left side road end and sets road end determination flag Fdw is set as Fdw=1. In a case where front left and right road wheel recess-and-convex determination flags FotFL and FotFR are FotFL=0 and FotFR=1, vehicle state controller 8 determines that the host vehicle is placed at a right side road end and sets road end determination flag Fdw =−1.

If the host vehicle is placed at neither one of the left side nor right side road ends, road end determination flag Fdw is reset as Fdw=0. In this way, after the host vehicle is determined whether it is placed at the road end, the routine shown in FIG. 6 goes to step S4. At step S4, vehicle state controller 8 determines whether the driver has the intention to make the traffic lane change and sets traffic lane change determination flag $F_{LC}$ on the basis of the result of the determination of whether the driver has the intention to make the traffic lane change and the routine goes to step S5. At step S5, vehicle state controller 8 determines the alarm (warning). Then, the routine goes to a step S6a. At step S6a, vehicle state controller 8 determines whether the host vehicle is deviated from the center of the traffic lane according to the recognition of the traffic lane in the same way as step S6 in the first embodiment and sets deviation determination flag $F_{LD}$. Corrections for deviation determination flag $F_{LD}$ and road end determination flag Fdw are carried out in accordance with traffic lane change determination flag $F_{LC}$. That is to say, if traffic lane change determination flag is $F_{LC}=1$, vehicle state controller 8 corrects deviation determination flag $F_{LD}$ and road end determination flag Fdw to zeroes since the driver has the intention to make the traffic lane change.

Then, after the correction of deviation determination flag $F_{LD}$ and road end determination flag Fdw are corrected, the routine goes to step S7. In the same way as described in the first embodiment, steering moment Mos is set. If deviation determination flag $F_{LD}=0$ and the host vehicle is not in the deviation, the routine goes to step S9 at which target yaw moment Ms is set as Ms=0. If deviation determination flag $F_{LD}\neq0$ and the vehicle is determined to have the tendency of the deviation, the routine goes to a step S23. At step S23, when road end determination flag Fdw corrected at step S6a indicates "1" or "−1", namely when the vehicle is placed at the road end, the routine goes to step S10. If road end determination flag Fdw is set as Fdw=0, namely, if the host vehicle is not placed at the road end, the routine goes to step S12. At step S10, vehicle state controller 8 determines whether yaw angle Φ can be deemed to be zero in the same way as described in the first embodiment. If can be deemed to be zero (Yes), the routine goes to step S1. At step S11, vehicle state controller 8 sets target yaw moment Ms in accordance with the steering moment. If cannot be deemed to be zero (No) at step S10, the routine goes to step S12. At step S12, vehicle state controller 8 sets target yaw moment Ms in accordance with the deviation quantity. After target yaw moment Ms is set at any one of steps S9, S11, and S12, the routine goes to step S13. At step S13 and S14, vehicle state controller 8 drivingly controls each part to develop target yaw moment Ms.

Figure 13A:
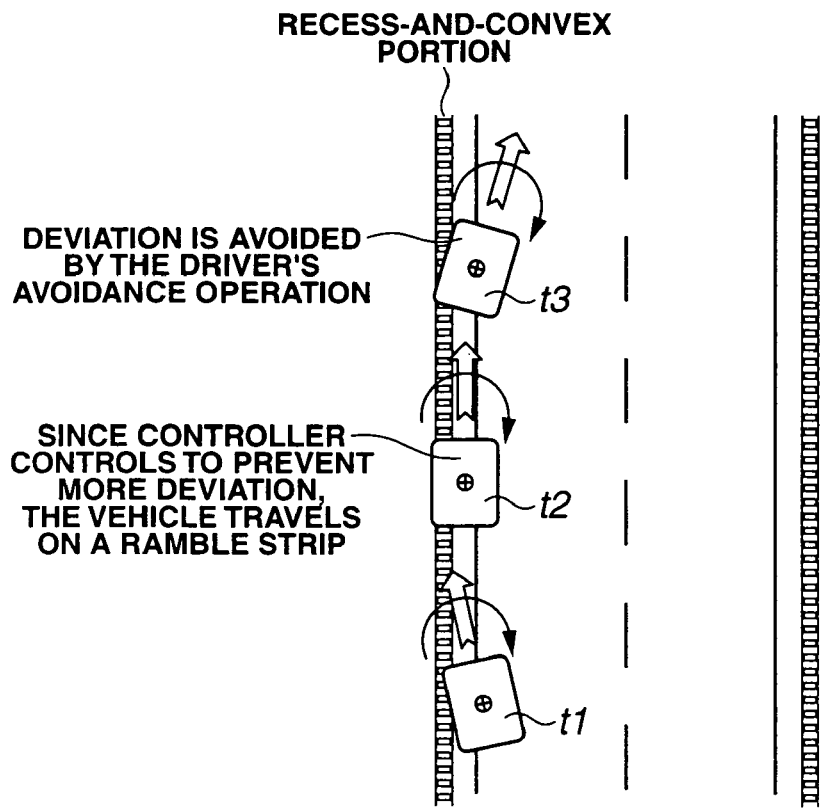
FIGS. 13A and 13B are explanatory views for explaining the operation of the second embodiment shown in FIG. 6.

Next, the operation in the case of the second embodiment will be described below. Suppose now that the host vehicle is traveling on the traveling traffic road where the recess-and-convex portion is disposed along (on) the traffic lane block line or in the proximity to (or along) the traffic lane block line as shown in FIG. 13A. At this time, in a case where the host vehicle is traveling on the center of the traffic lane, deviation estimated value XS calculated at step S3 satisfies neither XS>Xw nor XS<−Vw. Hence, the alarm is not produced at step S5. In addition, since neither XS≧Xc nor XS<−Xw is satisfied, deviation determination flag $F_{LD}$ is set as $F_{LD}=0$ (at step S6a). Then, since any road wheel of the host vehicle is not traveling on the recess-and-convex portion, the road wheel acceleration dVwi is not periodically vibrated. Recess-and-convex determination flags Fot1 and Fot2 are both set to zeroes ("0"), the host vehicle is determined to be not placed on the road end, and road end flag is set as Fdw=0 (steps S21, S22).

Then, at this time, since the host vehicle does not tend to deviate from the traffic lane, the routine shown in FIG. 6 goes from step S8 to step S9 so that target yaw moment Ms is set as Ms=0. Hence, the yaw moment due to the deviation preventive control is not developed. In other words, in the case where the host vehicle does not have the tendency of the deviation from the traffic lane, the yaw moment due to the deviation preventive control is not acted and the host vehicle motions in accordance with the driver's driving operation for the host vehicle. Then, suppose that, from this state, the host vehicle has the tendency of the deviation toward, for example, the leftward direction and deviation estimated value XS is increased. At a time point at which deviation estimated value XS gives XS>Xw, the alarm is produced (step S5) so that the driver receives the alarm that the host vehicle has the tendency of the deviation. However, at this time point, deviation determination flag is set as $F_{LD}=0$. Hence, the yaw moment by means of the deviation preventive control is not yet developed.

It is noted that, at this time, in a case where the driver manipulates direction indicator switch 20, the alarm is not produced since traffic lane change flag $F_{LC}$ is set to "1". Hence, the alarm is not produced in a state where the driver has the intention to make the traffic lane change. Suppose that, from this state, deviation estimated value XS is furthermore increased and XS≧Xc. At this time, deviation determination flag is set as $F_{LD}=1$ (step S6a). Then, at this time, in a case where, although the host vehicle has the tendency of the deviation toward the leftward direction, the host vehicle is still traveling within the traffic lane block lines and any one of the road wheels is not traveling on the recess-and-convex portion, no vibration occurs on road wheel acceleration dVwi of front left road wheel 5FL. Hence, vehicle state controller 8 determines that the host vehicle is not placed on the road end and road end flag is maintained as Fdw=0 (step S22). Thus, the routine goes from step S8 to step S12 via step S23. Only the deviation preventive control according to yaw moment is carried out. Target yaw moment Ms is calculated in accordance with the present estimated lateral displacement XS. Thus, since the yaw moment for the host vehicle to direct the yaw angle with respect to the traffic lane toward the traffic lane inner side direction is developed, the deviation of the host vehicle toward the leftward direction is suppressed.

In this way, the yaw moment toward the direction at which the deviation toward the leftward direction is avoided is developed and the alarm to inform the driver of the deviation from the traffic lane is developed, the host vehicle is moved toward the center of the traffic lane. In a state where estimated lateral displacement XS is below lateral displacement limitation value Xc, deviation determination flag is set as $F_{LD}=0$. Thus, the routine in FIG. 6 goes from step S8 to step S9. Since the traffic lane deviation tendency is not present, target yaw moment is set as Ms=0. Hence, in a state where the traffic lane deviation tendency is recovered, the yaw moment by means of the deviation preventive control is not developed so that unnecessary yaw moment is not developed.

Suppose, on the other hand, that, from a state where the traffic lane deviation tendency is present and the yaw moment is developed, the traffic lane deviation tendency becomes strong toward the leftward direction of the host vehicle. As shown in a state t11 in FIG. 13A, front left road wheel 5FL of the host vehicle is traveling on the recess-and-convex portion placed on the traffic lane block line or its proximity. In this situation, since front left road wheel 5FL is traveling on the recess-and-convex portion on the traffic lane block line or its proximity, a periodical vibration occurs on corresponding road wheel acceleration dVwFL of the front left road wheel 5FL. Therefore, the process at step S21 detects that the host vehicle is traveling on the recess-and-convex portion. Then, at step S22, vehicle state controller 8 determines that the host vehicle is placed at the left side road end and sets road end determination flag as Fdw=1. Then, since the host vehicle is being deviated and the host vehicle is placed at the left side road end, the routine goes from step S8 to step S10 via step S23. In a case where, while yaw angle Φ is not zero, in other words, the direction of the host vehicle with respect to the traveling traffic lane is in the deviation increase direction, the routine goes to step S12. Also in this case, the target yaw moment in accordance with the present deviation quantity is developed. Then, since the yaw moment in accordance with the deviation quantity, the yaw angle of the host vehicle with respect to the traffic lane is recovered to approximately zero, as shown in a state tl2 of FIG. 13A. At this time, the routine goes from step S10 to step S11. The reverse moment which can resist the steering moment developed according to the present steering angle δ is set as target yaw moment Ms. In this way, the steering moment and its reverse target yaw moment are acted so that the host vehicle is equivalent to the state in which the yaw moment due to the steering is not acted. Hence, the host vehicle maintains the state shown in state tl2 in FIG. 13A. That is to say, the host vehicle is continued to travel on the recess-and-convex portion of the ramble strip. In this way, the host vehicle travels on the recess-and-convex portion so that the vibration occurs. Hence, the driver can recognize that the host vehicle has the tendency of the deviation from the traveling traffic lane and has an unpleasant feeling due to the vibration. The driver cannot help carrying out the deviation avoidance operation and carries out the steering operation. Thus, as shown in a state tl13 of FIG. 13A, the yaw angle of the host vehicle is directed in the traffic lane inner side direction. Deviation estimated value XS becomes below lateral displacement limitation value Xc. In this state, traffic lane deviation determination flag indicates $F_{LD}=0$. The routine goes from step S8 to step S9. Then, target yaw moment is set as Ms=0. The development of the yaw moment by means of the deviation preventive control is ended.

Figure 13B:
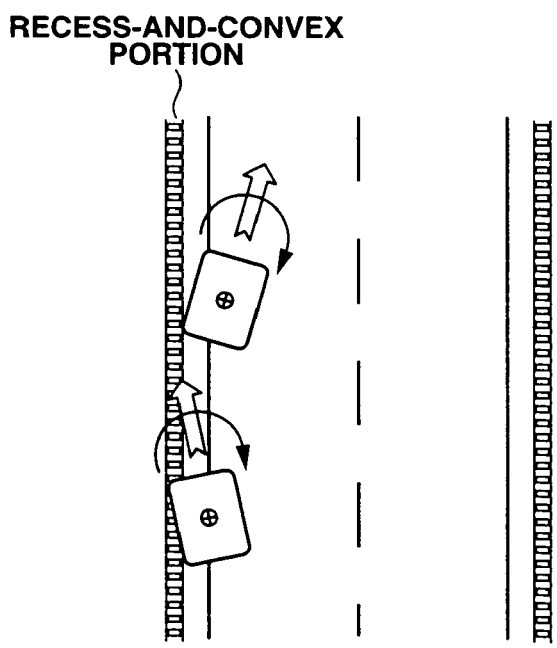

Therefore, in the second embodiment, in a case where vehicle state controller 8 detects that the host vehicle is traveling on the recess-and-convex portion disposed on the traffic lane block line or its proximity thereto, the yaw moment for the host vehicle to continue to travel on the recess-and-convex portion is developed. Hence, while avoiding the deviation from the traffic lane, the driver can be promoted to perform the traffic lane deviation avoidance operation in response to the vibration due to the continuation of the travel on the recess-and-convex portion. In addition, in this case, as shown in FIG. 13B, in a case where the yaw moment is developed by means of the deviation preventive control irrespective of the steering operation by the driver, the travel on the ramble strip can recognize the driver that the host vehicle has the tendency of deviation from the traffic lane. However, even if the driver does not perform the steering operation, the deviation is often avoided. As described above, however, the deviation preventive control avoids only the increase in the traffic lane deviation and does not perform the control for the vehicle to return to the center of the traveling traffic lane. Hence, the traffic lane deviation can be recognized by the driver and the driver can perform the traffic lane deviation avoidance operation.

It is noted that, in the second embodiment, the convex portion is formed as the recess-and-convex portion disposed on the traffic lane block line or in the proximity to the traffic lane block line. However, the second embodiment can apply the case where the recess portion is formed as the recess-and-convex portion. In this case, the same action and advantages can be achieved. In addition, in the second embodiment, road end determination flag Fdw is set on the basis of road wheel velocities VFL, VFR of front left and right road wheels 5FL, 5FR. The present invention is not limited to this. For example, road end determination flag Fdw may be set on the basis of road wheel velocities VRL, VRR of rear left and right road wheels 5RL, 5RR. Furthermore, road end determination flag Fdw may be set according to the fact that any one of the front and rear left and right road wheels 5FR through 5RR is traveling on the recess-and-convex portion.

In addition, in each embodiment, vehicle state controller detects whether the corresponding road wheel is placed on the recess-and-convex portion disposed on the traffic lane block (division) line or in the proximity to (along) the traffic lane block (division) line on the basis of the road wheel velocity of each road wheel. The present invention is not limited to this. For example, a suspension state detecting section (means) 24 is installed which detects a state of a vertical motion of the suspension, namely, vertical acceleration of the suspension or stroke quantity and, on the basis of a detection result of the suspension state detecting section, vehicle state controller 8 may detect that the road wheel is passing onto the recess-and-convex portion. Thus, by utilizing the result of detection of an acceleration sensor or stroke sensor for an active suspension installed to improve vehicular comfortability, it is not necessary to install various sensors exclusively for the deviation preventive control. Consequently, a cost of the lane keep control apparatus can be reduced.

Furthermore, for example, when a car navigation system detects that the host vehicle is traveling on a road other than the traveling traffic lane, the deviation preventive control may be halted. According to this situation, when the host vehicle is traveling on a parking lot or a location other than the traveling road, an erroneous detection that the host vehicle is traveling on the recess-and-convex portion can be avoided.

It is noted that, in each embodiment, at the process of step S6 in FIGS. 2 and 6, such a process that deviation determination flag $F_{LD}$ is set on the basis of estimated lateral displacement XS and lateral displacement limitation value Xc corresponds to a deviation tendency detecting section (means). The processes of steps S8 through S14 shown in FIG. 2 and steps S8 through S14 and step S23 shown in FIG. 6 correspond to a deviation avoidance controlling section (means). The process at step S12 shown in FIGS. 2 and 6 corresponds to a deviation reducing section (means). The process at step S11 shown in FIG. 2 or the processes of steps S23, S10, and S11 shown in FIG. 6 correspond to a vehicle direction maintenance controlling section (means). Steering angle sensor 19 corresponds to a steering quantity detecting section (means). The process at step S7 shown in FIGS. 2 and 6 corresponds to a steering yaw moment estimating section (means). The process at steps S21 and S22 shown in FIG. 6 corresponds to a road surface recess-and-convex portion detecting section (means). Road wheel velocity sensors 22FL through 22RR correspond to a road wheel velocity detecting section (means). Molecular (CCD) camera 13 corresponds to a photographing section. Camera controller 14 corresponds to a traffic lane block line detecting section (means). The process of calculating the yaw angle, the lateral displacement, and curvature by the process at step S2 shown in FIGS. 2 and 6 and camera controller 14 correspond to a lateral displacement estimation traveling state detecting section (means).

The entire contents of a Japanese Patent Application No. 2003-404633 (filed in Japan on Dec. 3, 2003) are herein incorporated by reference. The scope of the invention is defined with reference to the following claims.

What is claimed is:

1. A lane keep control apparatus for an automotive vehicle, comprising:
a deviation estimation value calculating section configured to calculate a deviation estimation value based on a position relationship between the vehicle and a traveling traffic lane;
a deviation tendency detecting section configured to receive the deviation estimation value and to detect whether the vehicle has a tendency of a deviation from a traveling traffic lane based on the deviation estimation value;

a yaw angle detection section configured to detect yaw angle of the vehicle with respect to the traveling traffic lane;

a deviation avoidance controlling section configured to provide yaw moment to the vehicle based on the deviation estimation value until the yaw angle becomes a predetermined value, wherein the predetermined value is zero or substantially zero; and a yaw moment estimation section configured to calculate a yaw moment estimation value in a direction in which the tendency of the deviation is detected, when the deviation tendency detecting section detects the tendency of the deviation that has been made by the vehicle, wherein the deviation avoidance controlling section is configured to control yaw moment of the vehicle in order for only the yaw moment in the direction of the deviation from the traffic lane to be canceled on a basis of the yaw moment estimation value calculated by the yaw moment estimation section, after the yaw angle becomes equal to the predetermined value, so as to allow a vehicle operator to steer the vehicle back to the traveling traffic lane without any assistance from the lane keep control apparatus.

2. A lane keep control apparatus for an automotive vehicle as claimed in claim 1, wherein the deviation avoidance controlling section comprises:

a deviation reduction controlling section that is configured to generate a yaw moment in a direction in which the yaw angle of the vehicle with respect to the traffic lane in the deviation direction of the vehicle from the traffic lane becomes small; and a vehicular direction maintenance controlling section that is configured to generate the yaw moment which enables a prevention of the increase of the yaw angle in the deviation direction of the vehicle from the traffic lane when the yaw angle of the vehicle can be deemed to be zero.

3. A lane keep control apparatus for an automotive vehicle as claimed in claim 2, wherein the lane keep control apparatus further comprises:

a steering quantity detecting section that is configured to detect a steering quantity of the vehicle; and a steering yaw moment estimating section that is configured to estimate a steering yaw moment developed on the vehicle according to the steering quantity detected by the steering quantity detecting section, wherein the vehicular direction maintenance controlling section generates the yaw moment to cancel the steering yaw moment in the deviation direction of the vehicle from the traffic lane estimated by the steering yaw moment estimating section.

4. A lane keep control apparatus for an automotive vehicle as claimed in claim 2, wherein the lane keep control apparatus further comprises a road surface recess-and-convex portion detecting section that detects whether the vehicle is traveling on a road surface recess-and-convex portion disposed on a traffic lane block line and wherein the vehicular direction maintenance controlling section generates the yaw moment which enables the prevention of the increase of the yaw angle in the deviation direction of the vehicle from the traffic lane when the road surface recess-and-convex portion section detects that the vehicle is traveling on the road surface-and-convex portion and when the yaw angle of the vehicle can be doomed to be zero.

5. A lane keep control apparatus for an automotive vehicle as claimed in claim 2, wherein the lane keep control apparatus further comprises a road surface recess-and-convex portion detecting section that detects whether the vehicle is traveling on a road surface recess-and-convex portion disposed in a proximity along a traffic lane block line and wherein the vehicular direction maintenance controlling section generates the yaw moment which enables the prevention of the increase of the yaw angle in the deviation direction of the vehicle from the traffic lane when the road surface recess-and-convel portion detecting section detects that the vehicle is traveling in the road surface recess-and-convex portion and when the yaw angle of the vehicle can be deemed to be zero.

6. A lane keep control apparatus for an automotive vehicle as claimed in claim 4, wherein the lane keep control apparatus further comprises a road wheel velocity detecting section that detects road wheel velocities of the vehicle and wherein the road surface recess-and-convex portion detecting section detects whether the vehicle is traveling on the recess-and-convex portion on the basis of the road wheel velocities detected by the road wheel velocity detecting section.

7. A lane keep control apparatus for an automotive vehicle as claimed is claim 6, wherein the road wheel velocity detecting section detects the road wheel velocities of left and right road wheels of the vehicles and wherein the road surface recess-and-convex portion detecting section detects that the vehicle is traveling on the road surface recess-and-convex portion when only one of the road velocities of the left and right road wheels is varied.

8. A lane keep control apparatus for an automotive vehicle as claimed in claim 6, wherein the road wheel velocity detecting section detects the road wheel velocities of front left and right road wheels of the vehicle and wherein the road surface recess-and-convex portion detecting section detects that the vehicle is traveling on the road surface recess-and-convex portion when only one of the read wheel velocities of the front left and right road wheels is varied.

9. A lane keep control apparatus for an automotive vehicle as claimed in claim 6, wherein the road surface recess-and-convex portion detecting section detects that the vehicle is traveling on the road surface recess-and-convex portion when one of the road wheel velocities of the vehicle is varied at a period preset in accordance with a traveling speed of the vehicle.

10. A lane keep control apparatus for an automotive vehicle as claimed in claim 4, wherein the lane keep control apparatus further comprises a suspension state detecting section that detects a state of a verticle movement of a vehicular suspension and wherein the road surface recess-and-convex portion detecting section detects whether the vehicle is traveling on the road surface recess-and-convex portion on the basis of the state of the vertical movement of the vehicular suspension detected by the suspension state detecting section.

11. A lane keep control apparatus for an automotive vehicle as claimed in claim 1, wherein the lane keep control apparatus further comprises:

a photographing section that is configured to photograph an image in a forward direction of the vehicle; and a traffic lane block line detecting section that is configured to detect a traffic lane block line from the image photographed by the photographing section, wherein the deviation tendency detecting section detects a deviation quantity of the vehicle from the traveling traffic lane on the basis of the deviation quantity and detects whether the vehicle has the tendency of the deviation from the traveling traffic lane on the basis of the detected deviation quantity.

12. A lane keep control apparatus for an automotive vehicle as claimed in claim 2, wherein the lane keep control apparatus further comprises:

a lateral displacement estimation traveling state detecting section that is configured to detect a traveling speed of the vehicle, the yaw angle of the vehicle with respect to the traveling traffic lane, a lateral displacement of the vehicle with respect to the traveling traffic lane, and a curvature of the traveling traffic lane on which the vehicle is traveling, wherein the deviation tendency, detecting section estimates a future lateral displacement of the vehicle with respect to the traveling traffic lane as the deviation quantity on the basis of a result of detection by the lateral displacement estimation traveling state detecting section and detects that the vehicle has the tendency of the deviation from the traveling traffic lane when the future lateral displacement of the vehicle with respect to the traveling traffic lane is equal to or larger than a preset lateral displacement limitation value.

13. A lane keep control apparatus for an automotive vehicle according to claim 1, wherein the deviation avoidance controlling section is configured to maintain the vehicle on the road surface which is parallel to the traveling traffic lane by the deviation avoidance controlling section until a vehicle operator steers the vehicle back to the traveling traffic lane or to another traffic lane.

14. A lane keep control apparatus for an automotive vehicle according to claim 1, wherein the road surface which is parallel to the traveling traffic lane includes the traveling traffic lane and an adjacent traffic lane or road shoulder.

15. A lane keep control apparatus for an automotive vehicle according to claim 1, wherein the vehicle is maintained in a substantially straight traveling direction on the road surface which is parallel to the traveling traffic lane by the deviation avoidance controlling section.

* * * * *